United States Patent [19]

Hametner et al.

[11] Patent Number: 5,046,852
[45] Date of Patent: Sep. 10, 1991

[54] METHOD AND APPARATUS FOR BENDING AN ELONGATE WORKPIECE

[75] Inventors: Albert L. Hametner, Seattle; Larry L. Tammell, Federal Way, both of Wash.

[73] Assignee: The Boeing Company, Seattle, Wash.

[21] Appl. No.: 397,677

[22] Filed: Aug. 23, 1989

Related U.S. Application Data

[62] Division of Ser. No. 245,455, Sep. 16, 1988, Pat. No. 4,947,666.

[51] Int. Cl.$^5$ .............................................. G01B 11/24
[52] U.S. Cl. ..................... 356/398; 356/376; 382/63
[58] Field of Search ............... 356/375, 376, 394, 398; 382/62, 63

[56] References Cited

U.S. PATENT DOCUMENTS

| | | | |
|---|---|---|---|
| 3,509,415 | 4/1970 | Bartz | 382/63 |
| 4,122,525 | 10/1978 | Eaton | 356/398 |
| 4,677,302 | 6/1987 | Chiu et al. | 356/376 |
| 4,815,857 | 3/1989 | Bragd | 356/376 |

Primary Examiner—Richard A. Rosenberger
Attorney, Agent, or Firm—Dellett, Smith-Hill and Bedell

[57] ABSTRACT

Apparatus for bending an elongate workpiece to a desired configuration includes a memory for storing information representative of the desired configuration and information representative of bending operations to be performed by a bending machine. A position sensor is used to scan a workpiece that has been bent using the bending machine, and thereby generate information representative of the actual configuration of the workpiece. The information representative of the actual configuration of the workpiece is compared with the information representative of the desired configuration and, in the event that there is a difference between the actual configuration and the desired configuration, and the difference is beyond a predetermined tolerance, the information representative of bending operations is modified in a manner such as to reduce the difference.

4 Claims, 15 Drawing Sheets

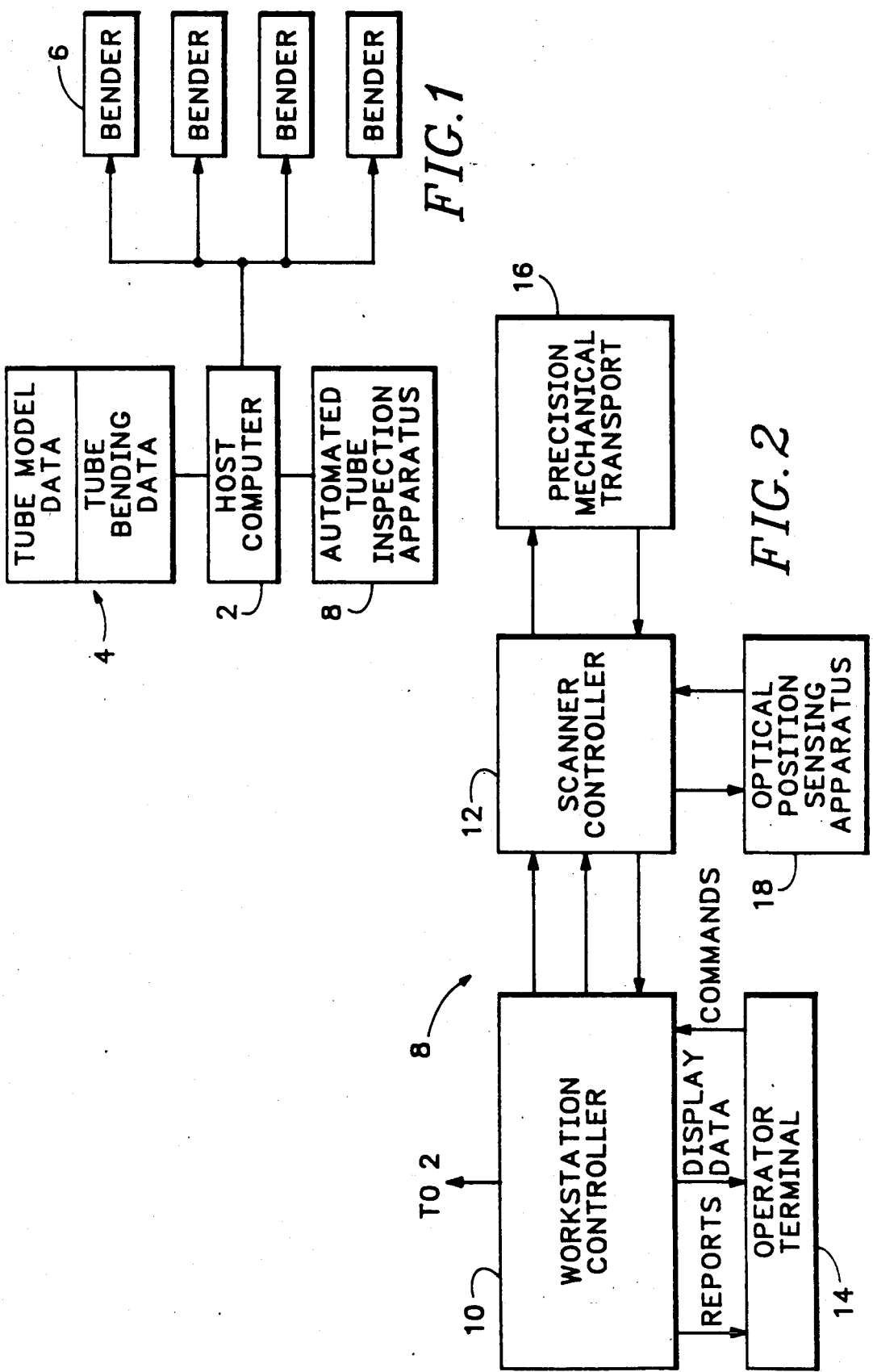

IMAGE INTERPRETATION
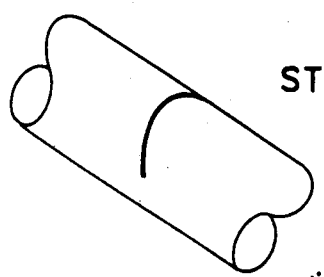
STEP 1 VIDEO IMAGE
STEP 2 SCANNER IMAGE AND CENTROID
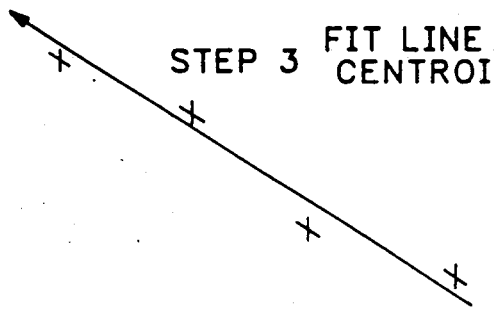
STEP 3 FIT LINE TO CENTROIDS
FIG.17
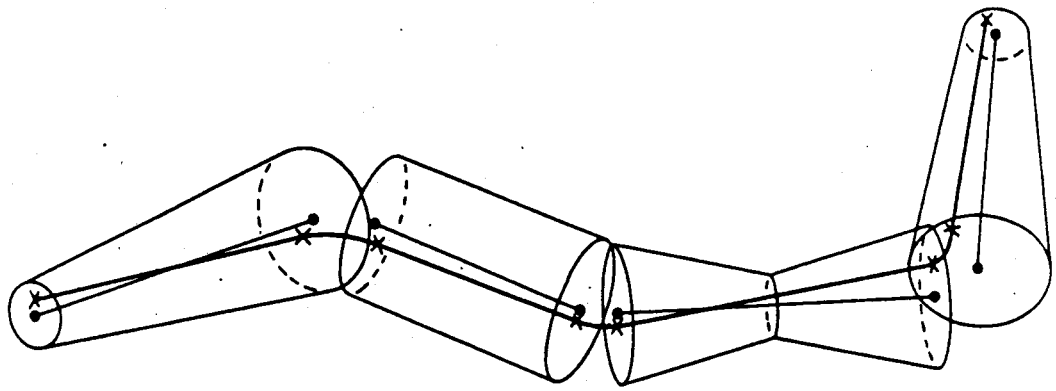
FIG.20

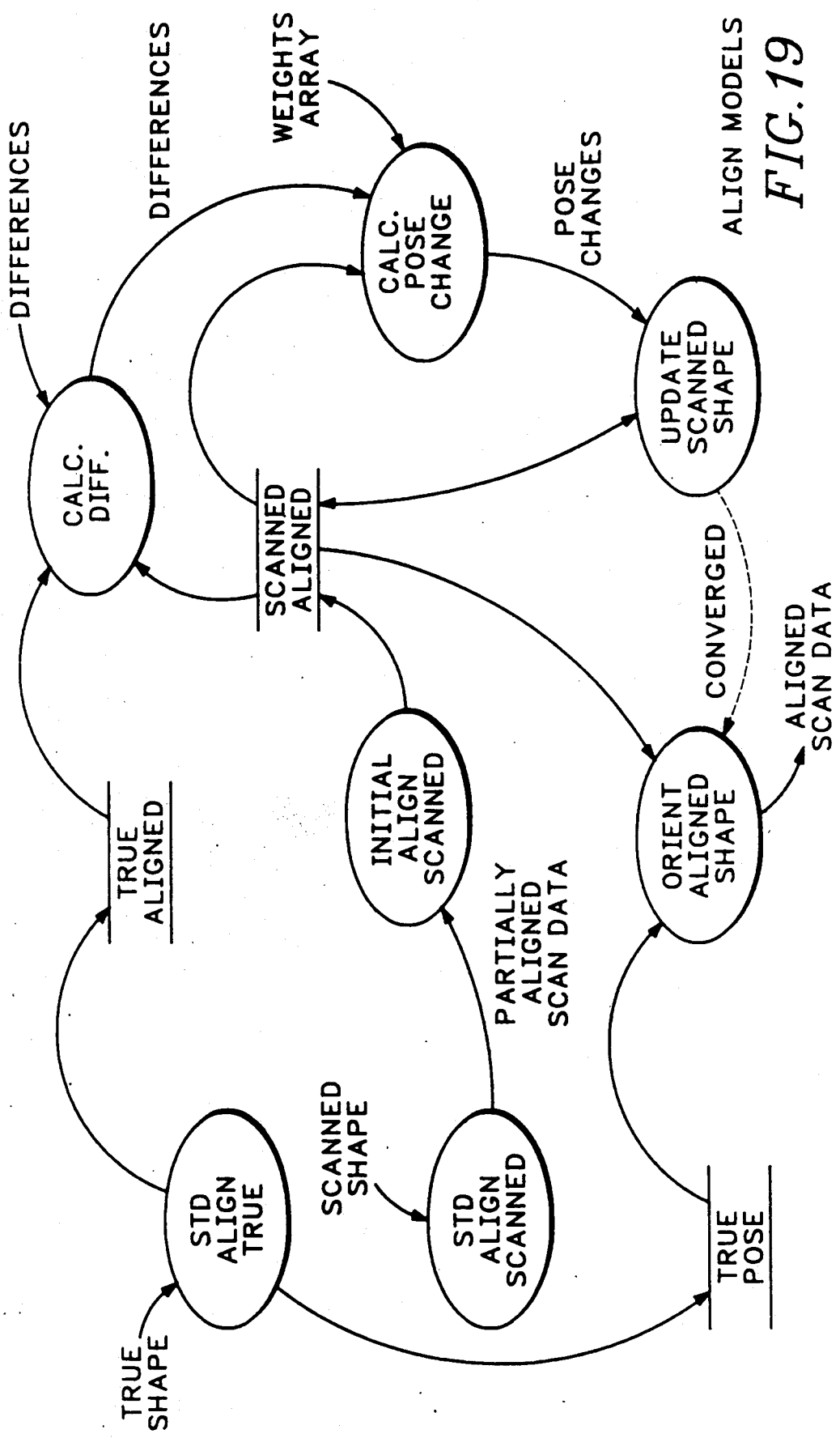

METHOD AND APPARATUS FOR BENDING AN ELONGATE WORKPIECE

CROSS-REFERENCE TO RELATED APPLICATION

This is a divisional of copending application Ser. No. 07/245,455 filed Sept. 16, 1988, now U.S. Pat. No. 4,947,666.

BACKGROUND OF THE INVENTION

This invention relates to a method and apparatus for bending an elongate workpiece.

Metal tubes used in aircraft, e.g. in hydraulic systems, are of many different shapes and sizes. A prototype tube, which constitutes a tube standard, is defined during design of the aircraft using a computer-aided design (CAD) system and is bent to fit that definition. The bends are all of the same nominal radius. Alternatively, a prototype is bent to fit a mock-up of the aircraft. Data defining the prototype tube ("tube model description") is generated using a manually operated, five axis, position-sensing probe, such as the probe sold by Eaton-Leonard Inc. under the trademark VECTOR 1. The tube model description may define the prototype tube in intersection point format. In this format, the tube model description defines the tube end points and intersection points in an X-Y-Z Cartesian frame of reference. An intersection point is the point defined by the intersection of the axes of two straight sections, or legs, of the tube. The prototype tube is numbered, labeled and placed in storage.

Production tubes (tubes for use in manufacture of aircraft) are manufactured from straight lengths of tube using a numerically-controlled tube bender. The bender operates under control of a bend program, which is generated from the tube model description by modifying it to take account of springback and other systematic effects. The bend program is generally stored in L-R-A format, where L stands for length, R stands for rotation, and A stands for angle of bend. A production tube is measured after bending using mechanical gauges, which reflect the tube model description. If the bent tube does not conform to the desired configuration for that tube, the operator of the tube bender must modify the bend program. The sequence of bending and modifying is repeated until a bent tube is a satisfactory fit in the fixture. When a satisfactory fit is obtained, a batch of, e.g. 8 to 15, tubes is bent.

It is necessary to carry out this sequence of operations when each batch is bent because of the possibility of variations from batch to batch in tube material, tube diameter, wall thickness and spring-back. In addition, the set-up of the tube bender might change from batch to batch and this may necessitate a change in the bend program.

Previous attempts to facilitate the operation of checking and, if necessary, modifying the bend program by automating the comparison of a bent tube with the prototype tube have been unsuccessful because the prior methods have been too slow or too inaccurate or have not been technically feasible. For example, attempts have been made to measure the configuration of production tubes using the same type of position-sensing probe as is used to generate the tube model description. However, this method was found to be slow and inaccurate, and required a human operator to control the positioning of the probe. One form of the VECTOR 1 probe requires contact with the tube and carries with it the possibility that the tube will be distorted. A version of the VECTOR 1 probe employs an infrared shadow detector instead of a contact probe. Although the shadow detector does not touch the tube, and therefore there is no danger that the tube will be distorted, manual positioning of the probe is still required.

EOIS Corporation has announced a non-contact tube inspection system in which the tube is placed on a light table and is inspected using at least two video cameras that view the tube.

SUMMARY OF THE INVENTION

A preferred embodiment of the present invention in a first aspect is apparatus for bending an elongate workpiece to a desired configuration. The apparatus includes storage means for storing information representative of the desired configuration and information representative of bending operations to be performed by a bending machine. Data collection means are used to scan a workpiece that has been bent using the bending machine, and thereby generate information representative of the actual configuration of the workpiece. The information representative of the actual configuration of the workpiece is compared with the information representative of the desired configuration and, in the event that there is a difference between the actual configuration and the desired configuration, and the difference is beyond a predetermined tolerance, the information representative of bending operations is modified in a manner such as to reduce the difference.

A preferred embodiment of the invention in a second aspect is a method of determining whether a bent workpiece conforms to a desired configuration. The workpiece is optically scanned and information representative of the actual configuration of the workpiece is generated. This information is compared with information representative of the desired configuration.

A preferred embodiment of the invention in a third aspect is a method for determining whether an elongate workpiece, which is nominally of a desired configuration, conforms to the desired configuration within a predetermined tolerance. The method comprises carrying out a first data collection and generating first information representative of the locations of elements of the workpiece in a frame of reference. The first information is compared with information representative of the desired configuration. The result of the comparison is used to estimate the location and orientation of the workpiece in the frame of reference and determine an optimum path for scanning the workpiece. A position sensor is used to carry out a second data collection, by transporting the position sensor along the optimum path, and generate second information representative of the locations of elements of the workpiece in the frame of reference. The second information is compared with the information representative of the desired configuration.

A preferred embodiment of the invention in a fourth aspect is a method of producing an elongate workpiece that has been bent to a desired configuration, comprising:

(a) bending a workpiece using a sequence of bend instructions, (b) carrying out a first data collection and generating first information representative of the actual configuration of the workpiece, (c) comparing the first information with information representative of the desired configuration, (d) using the result of the comparison to estimate the location and orientation of the workpiece and determine an optimum path for scanning the workpiece, (e) using a position sensor to carry out a second data collection, by transporting the position sensor along the optimum path, and generate second information representative of the actual configuration of the first workpiece, (f) comparing the second information with the information representative of the desired configuration and, if the comparison indicates that the workpiece conforms to the desired configuration within a predetermined tolerance, bending at least one additional workpiece using said sequence of bend instructions, and otherwise adjusting the bend instructions.

A preferred embodiment of the invention in its fifth aspect is a method of producing an elongate workpiece that has been bent to a desired configuration, comprising:

(a) bending a workpiece using a sequence of bend instructions, (b) carrying out a first data collection and generating first information representative of the actual configuration of the workpiece, (c) comparing the first information with information representative of the desired configuration, (d) using the result of the comparison to estimate the location and orientation of the workpiece and determine an optimum path for scanning the workpiece, (e) using a position sensor to carry out a second data collection, by transporting the position sensor along the optimum path, and generate second information representative of the actual configuration of the first workpiece, (f) comparing the second information with the information representative of the desired configuration and (g) (A) if the comparison indicates that the workpiece conforms to the desired configuration within a predetermined tolerance, bending at least one additional workpiece using said sequence of bend instructions, and otherwise (B) adjusting the bend instructions, bending a second workpiece using the adjusted bend instructions, and repeating steps (b)-(f).

A preferred embodiment of the invention in a sixth aspect is a method for determining whether an elongate workpiece at an arbitrary location in a frame of reference conforms to a desired configuration. A first data collection is carried out and generates first information representative of the actual configuration of the workpiece. The first information is compared with information representative of the desired configuration. The result of the comparison is used to estimate the location and orientation of the workpiece in the frame of reference and determine an optimum path for scanning the workpiece. A second data collection is carried out by transporting a position sensor along the optimum path, and using the position sensor to generate second information representative of the actual configuration of the workpiece. The second information is compared with the information representative of the desired configuration.

It is therefore an object of the present invention to provide improved apparatus for bending hydraulic tubes and the like, which apparatus does not require human intervention in order to determine whether the bent tube conforms to a standard and, if it does not, adjust the bend instructions in such a manner that the difference between the tube standard and a tube and that is bent in accordance with the adjusted instructions is less than the difference between the tube standard and a tube that is bent in accordance with the original instructions.

BRIEF DESCRIPTION OF THE DRAWINGS

For a better understanding of the invention, and to show how the same may be carried into effect, reference will now be made, by way of example, to the accompanying drawings in which:

FIG. 1 is a simplified block diagram of a tube bending system embodying the present invention, FIG. 2 is a more detailed block diagram of tube inspection apparatus which forms part of the tube bending system;

FIG. 17 illustrates the steps involved in locating the axis of a cylinder section of a tube, FIG. 19 illustrates the data flow for alignment of detailed tube shape data to desired configuration, FIG. 20 illustrates the application of inspection criteria for determining whether the detailed tube shape features are sufficiently close to the desired configuration.

DETAILED DESCRIPTION

Figure 3:
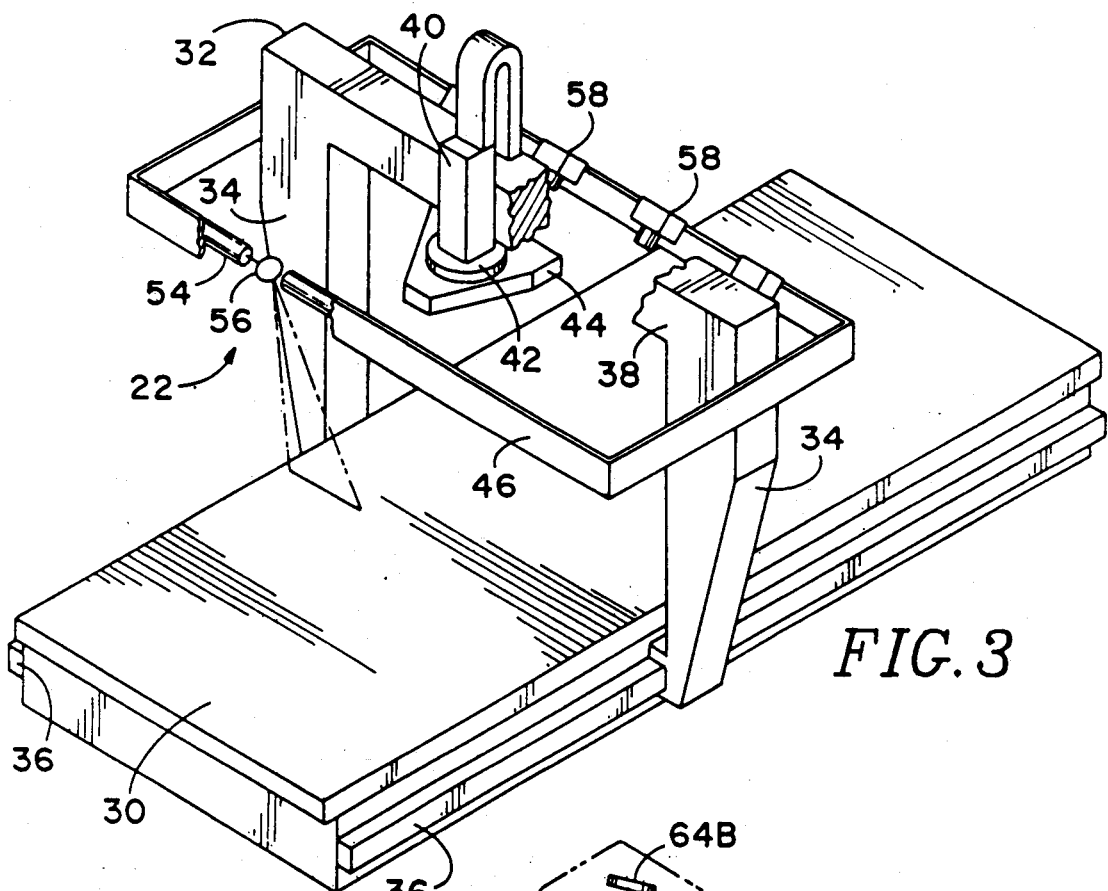
FIG. 3 is a perspective view of a precision mechanical transport which forms part of the tube inspection apparatus and which carries optical scanning apparatus.

The tube bending system illustrated in the drawings comprises a host computer 2 having a database memory 4 in which tube model description defining a desired tube configuration is stored. The tube model description may be stored in any of several formats, such as LRA or intersection point format. A bend program is also stored in the database memory. The bend program stored in the memory 4 represents bending operations to be performed by automatic tube benders 6, using bend programs obtained from the computer 2, in order to bend a tube to the desired configuration. When a tube has been bent, an automated tube inspection apparatus (ATIS) 8 uses desired configuration data from the computer 2 to determine whether the bent tube conforms to the desired configuration.

Figure 8:
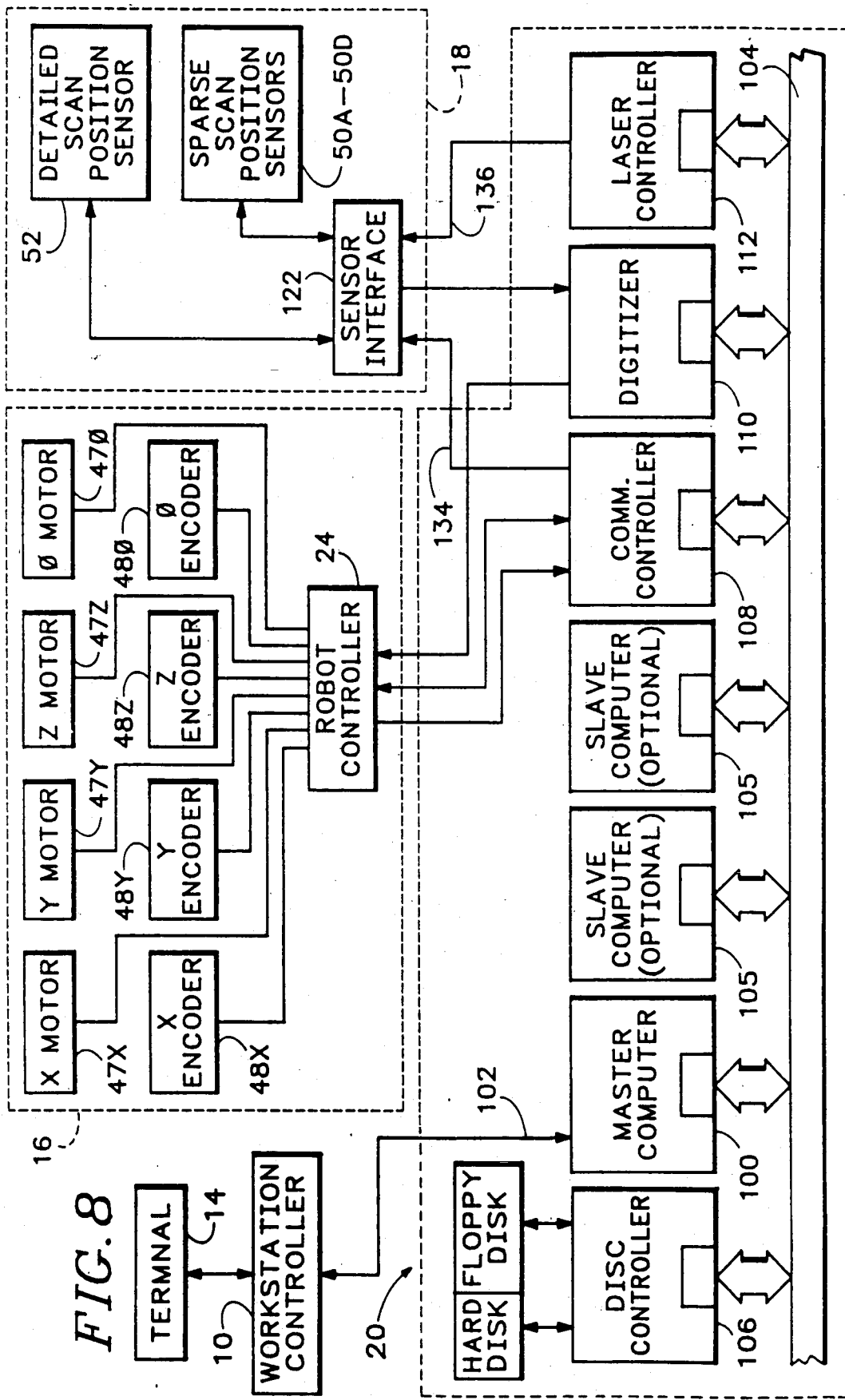
FIG. 8 is a block diagram of a scanner controller, for controlling both the optical scanning apparatus and the precision mechanical transport.

As shown in FIG. 2, the ATIS 8 includes a workstation controller 10 which communicates with the computer 2, a scanner controller 12 and an operator terminal 14. The scanner controller 12 communicates with a precision mechanical transport 16 and with optical position sensing apparatus 18. The scanner controller, the precision mechanical transport and the optical position sensing apparatus together constitute a scanner 20. The precision mechanical transport comprises a robot 22 (FIG. 3), on which the optical position sensing apparatus is mounted, and a robot controller 24 (FIG. 8). The robot comprises a gantry 32 which extends over an elongate horizontal table 30.

A global Cartesian coordinate system (X,Y,Z) has its origin at one corner of the table. The X axis is a horizontal axis extending longitudinally of the table, the Y axis is horizontal and extends perpendicular to the X axis, and the Z axis is vertical. The gantry 32 comprises two vertical columns 34 which run on tracks 36 at opposite sides respectively of the table, and a horizontal bridge 38 which connects the columns 34 and extends over the table 10. Therefore, the gantry is movable in the X direction (longitudinally of the table 10) between a home position (X=0) at one end of the table and the opposite end of the table.

The gantry carries a support frame 46 which is stationary relative to the columns 34. The bridge 38 has tracks (not shown) along which a Y axis transport 40 is movable. The Y axis transport 40 carries a Z axis transport 42 which is vertically movable relative to the bridge 38. A scan head 44 is rotatable relative to the Z axis transport 42 about a vertical axis. The gantry 32, the Y axis transport 40, the Z axis transport 42 and the scan head 44 are movable along (or rotatable about) the respective axes under control of servo motors 47 (FIG. 8), and their positions along (or about) the respective axes are detected by means of encoders 48 (also shown in FIG. 8). The scan head is indexed to eighteen rotational positions about its vertical axis of rotation, each two adjacent positions being spaced by 20°.

Figure 5:
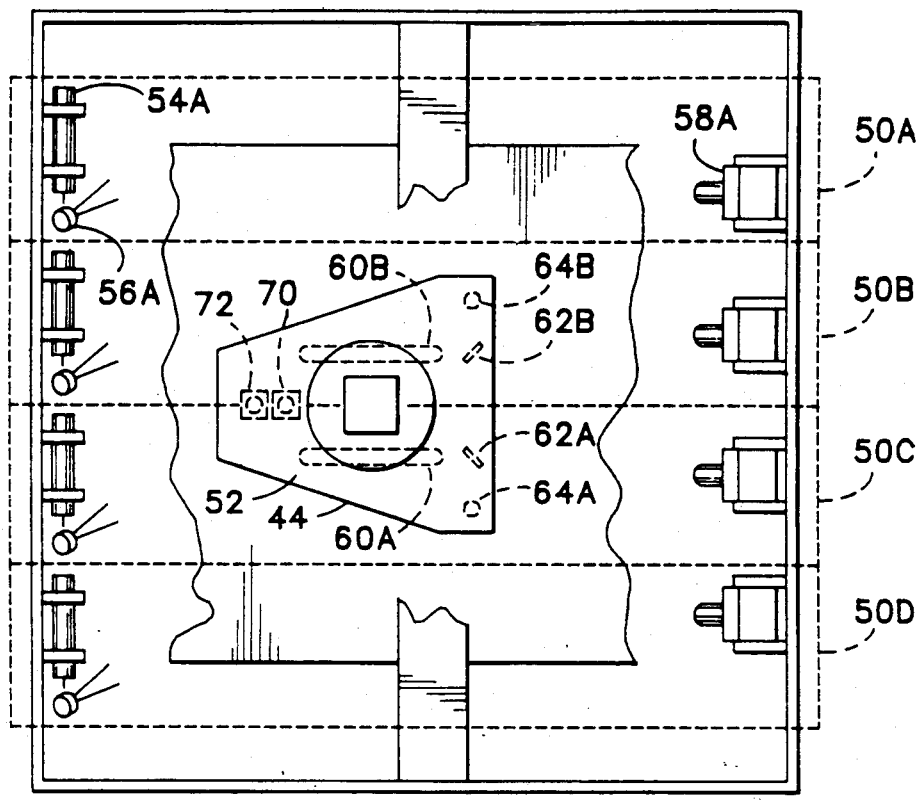
FIG. 5 is a top plan view, partly broken away, of the precision mechanical transport and shows the detailed scan position sensor and four sparse scan position sensors.

As shown in FIG. 5, the optical position sensing apparatus 18 comprises four sparse scan position sensors 50A, 50B, 50C and 50D, and a detailed scan position sensor 52. Each sparse scan position sensor 50 comprises a continuous wave laser light source 54, a mirror 56, and a video camera 58, all mounted on the frame 46. The camera 58, which may be a CID TEC Inc. solid state CID camera, is disposed with its optical axis inclined to the vertical. The optical axis of the camera intersects the horizontal table surface at the origin of a local Cartesian coordinate system for that sensor. The local coordinate system has a first horizontal (or X') axis, which extends through the local origin and is perpendicular to the optical axis of the camera and parallel to the horizontal scan direction of the camera, a second horizontal (Y') axis, which is perpendicular to the X' axis, and a vertical (Z') axis. The camera 58 is oriented so that its local Y' axis direction is parallel to the global Y direction. The calibrated transformation of local (X',Y',Z') coordinates of a sparse scan position sensor is combined with the global (X,Y,Z) coordinates of the position of the gantry along the X axis and the position of the sensor along the Y axis, which latter position is fixed, to obtain coordinates in the global coordinate system.

Figure 6:
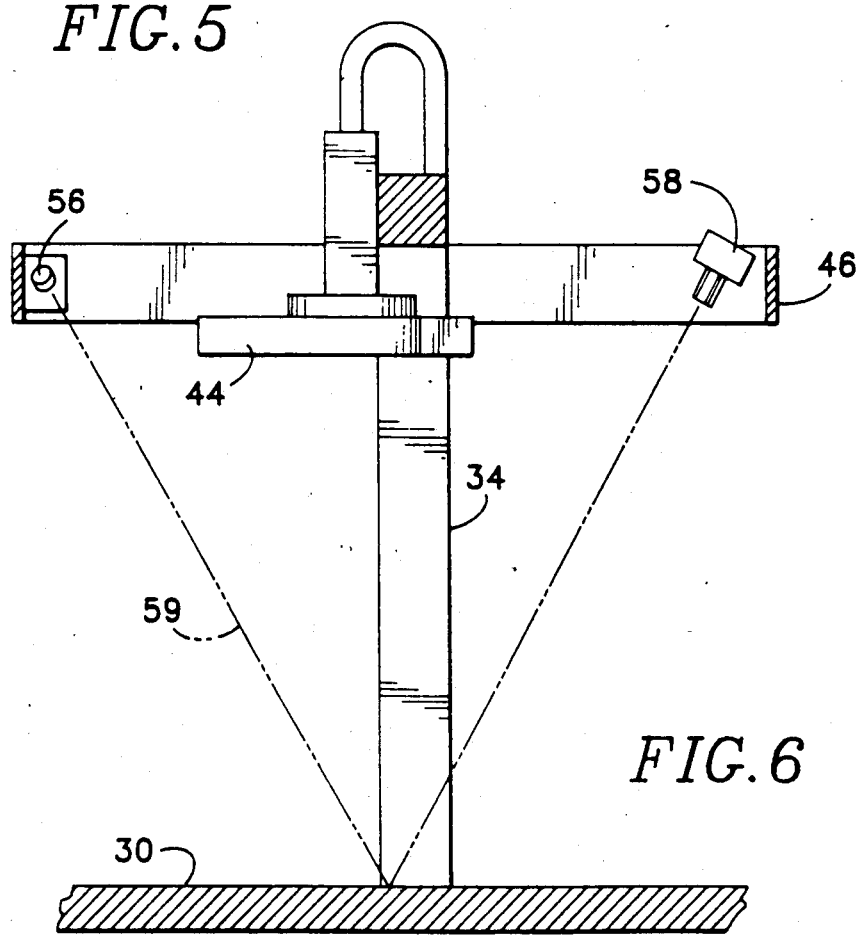
FIG. 6 is a side view, partly broken away, of the precision mechanical transport.

The output beam from the laser light source 54 is applied to the mirror 56, which reflects the beam downwards towards the top of the table 30, in a beam plane 59 (FIG. 6) that is inclined to the X-Y plane and is perpendicular to the X-Z plane. The mirror 56 is driven to oscillate at a frequency of 60 Hz by a galvanometer 80 (FIG. 9) and accordingly the reflected beam is deflected in its beam plane so that it scans a stripe that extends in the Y direction on the surface of the table 30. The four stripes, scanned by the four sparse scan position sensors respectively, are collinear. The mirrors are driven by the galvanometers in such manner (described hereinafter) that each stripe is about 30 cm long and the stripes are end-to-end and the reflected beams sweep in phase with each other along their respective stripes. The camera 58 of each sparse scan position sensor is positioned so that the stripe traced upon the work surface by the light beam provided by that sensor appears in the camera's field of view as a line in the Y' direction near one end of the X' direction sensing range. Where the optical axis of the camera intersects the table top, the field of view of the camera is approximately 30 cm in the X', Y' and Z' directions.

Figure 4:
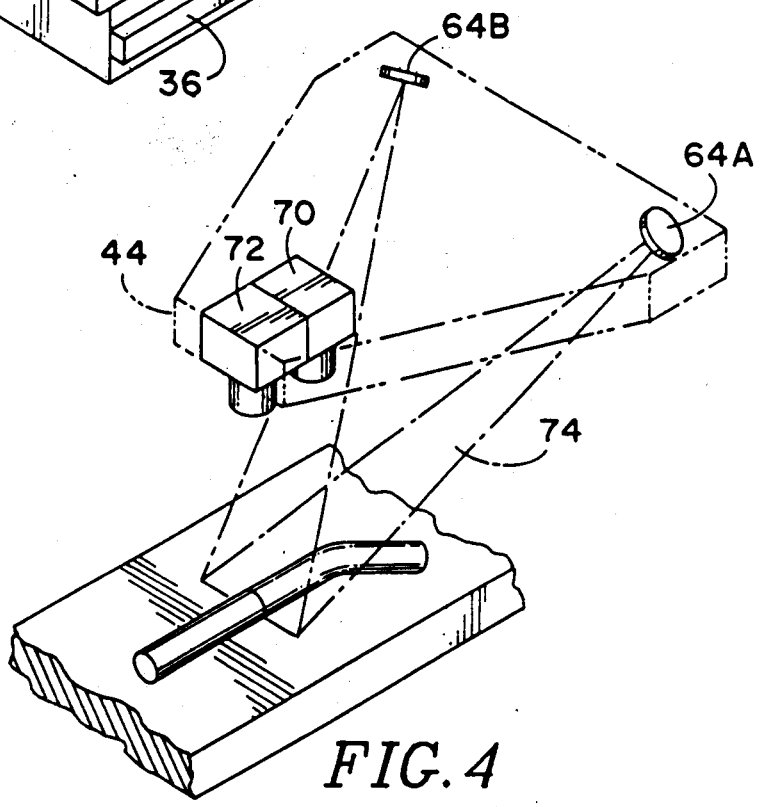
FIG. 4 is a more detailed perspective view of a detailed scan position sensor in the optical scanning apparatus.

As shown in FIG. 5, the detailed scan position sensor 52 is mounted in the scan head 44 and comprises two video cameras 70,72, also shown in FIG. 4, whose optical axes are vertical and parallel to the rotational axis of the scan head 44. The camera 70 has a 3.81 cm field of view and is used for inspecting tubes from 0.47 cm to 2.54 cm in diameter, and the camera 72 has a 7.62 cm field of view and is used to inspect tubes from 2.54 cm to 7.62 cm in diameter. Each of the cameras 70 and 72 may be a CID TEC Inc. solid state CID camera. The detailed scan position sensor also comprises two continuous wave laser light sources 60A, 60B. The output beams provided by the sources 60A, 60B are applied to respective stationary mirrors 62A, 62B, which reflect the two beams horizontally towards respective movable mirrors 64A, 64B. The mirrors 64 reflect the respective beams towards the table top. The two reflected beams lie in a beam plane 74 which intersects the optical axes of the cameras 70 and 72. The intersection of the beam plane with the optical axis of the camera that is used for a detailed scan of a particular tube is the origin of a local Cartesian coordinate system for the detailed scan position sensor. This local coordinate system has a first horizontal (or X") axis, a second horizontal (Y") axis, which is perpendicular to the X" axis, and a vertical (Z") axis, which lies along the camera's optical axis and is perpendicular to the X" and Y" axes. The local X" axis is parallel to the horizontal scan direction of the cameras 70 and 72. The calibrated transformation between the local (X",Y",Z") coordinate system and the global (X,Y,Z) coordinate system depends on the position of the scan head along the X,Y and Z axes and on its angular position about its vertical axis of rotation. In one of the eighteen rotational positions of the scan head 44, the X"-Z" plane is parallel to the X-Z plane. For computational efficiency, the local coordinate transformations are combined with the eighteen pre-calculated sensor transformations. Transformed coordinates are combined with the global (X, Y, Z) coordinates of the gantry points to provide coordinates in the global coordinate system. The mirrors 64 are driven to oscillate at a frequency of 60 Hz by galvanometers 82 (FIG. 9), and the reflected beams are deflected in the beam plane 74 so that they each scan a stripe that extends in the Y" direction on the surface of the table. The mirrors are symmetrically positioned on opposite sides of the X"-Z" plane and so the two stripes coincide and the two beams illuminate opposite respective sides of an object that extends generally normal to that plane.

Each sparse scan position sensor and the detailed scan position sensor may be a 100X three-detailed dimensional scanner of the kind manufactured by Technical Arts Corporation of Redmond, Wash. For a complete description of the operation of the 100X scanner, reference may be made to Technical Arts Corporation, 100 X 3-Dimensional Scanner User's Manual and Programming Guide.

Figure 7A:
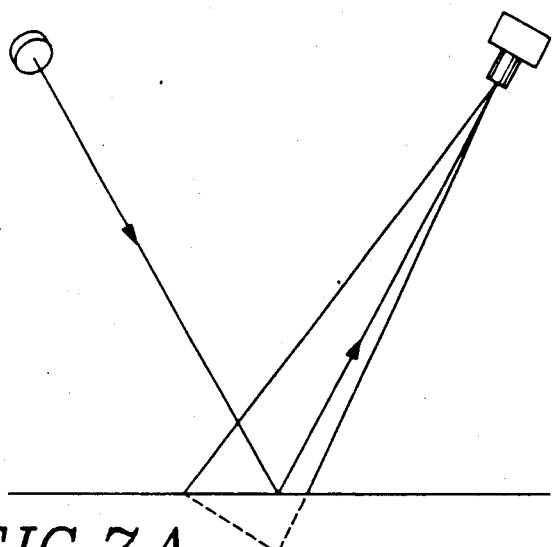
FIGS. 7A-7F illustrate how the sparse scan position sensor and the detailed scan position sensor provide information relating to the position of a reflective surface element.
Figure 7B:
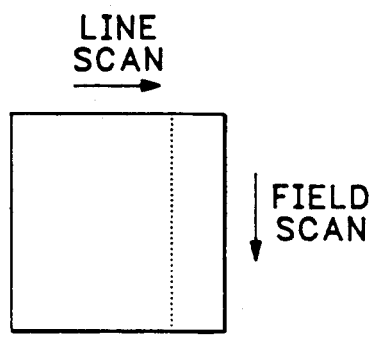
Figure 7C:
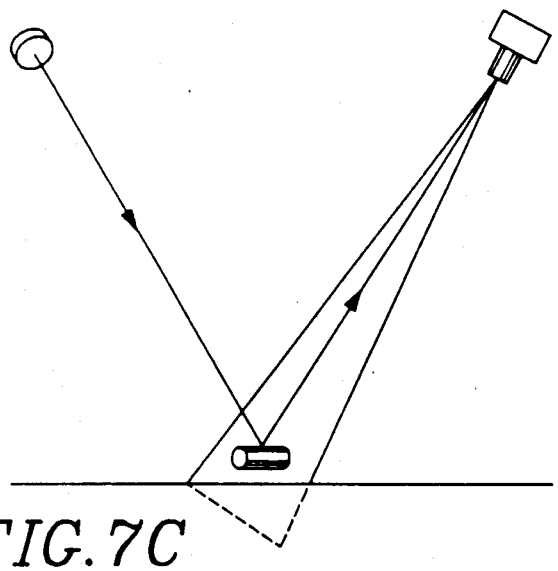
Figure 7D:
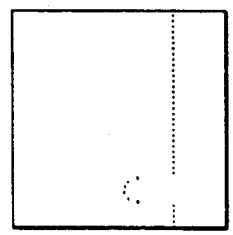
Figure 7E:
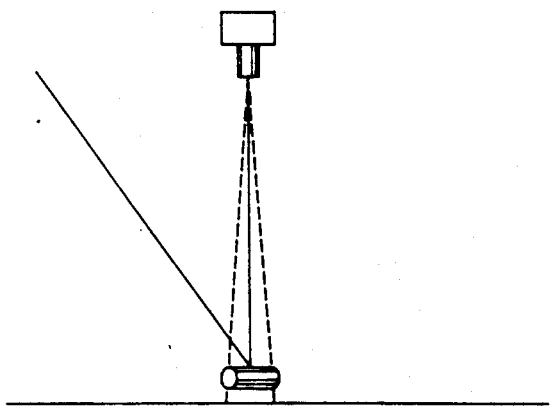
Figure 7F:
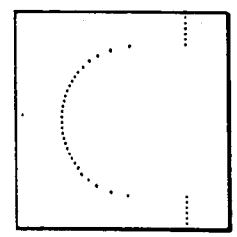

FIG. 7A illustrates the paths of light rays that are reflected from the table surface towards one of the cameras, represented by way of example as the camera 58A, and FIG. 7B illustrates the corresponding field of view of the camera, the line and field scanning directions being as shown in FIG. 7B. The dark line in FIG. 7B represents the location in the field of view of the stripe that is illuminated by the laser beam. The persistence of the sensor surface of the camera 58 is such that each pixel represents the intensity of reflected light received over the preceding sixtieth of a second, i.e., during the preceding scan of the laser beam. FIGS. 7C and 7D illustrate corresponding views for light rays that are reflected from a cylinder that is somewhat above the table surface and has a limited width with respect to the field of view of the camera. It can be seen from FIGS. 7A-7D that the video signal provided by the camera 58 contains information regarding the Y' and Z' positions of the surface region of the cylinder where it intersects the plane of the light beam. The X' position of the surface region is implicit in the geometry of the position sensor and the value of Z'. The range of values of Z' that can be detected by the position sensor depends on the size of the field of view of the camera and also on the angle between the plane of the light beam and the optical axis of the camera. Similarly, as indicated in FIGS. 7E and 7F, the video signal provided by the camera 70 or 72 contains information regarding the Y" and Z" positions of the surface region of a cylinder where it is intersected by the plane of the light beams provided by the mirrors 64, and the X" position of the surface region can be calculated from the geometry of the detailed scan position sensor and the value of Z". By combining the information contained in the video signals with information relating to the position of the sensor device relative to the table, data is provided that represents the location of the surface elements of the tube in the (X,Y,Z) coordinate system.

The scanner controller is shown in FIG. 8 and comprises master computer 100 and, optionally, two slave computers 105. The master computer 100 communicates with the workstation controller 10 over an RS232 serial interface 102 and communicates via a bus 104 with the slave computers 105, a disk controller 106, a communications controller 108, a digitizer 110, and a laser controller 112. The computers 100, 105 may comprise respective Intel SBC 386/24 Single Board Computers; the communications controller an Intel SBC 286/12 Single Board Computer and the disk controller an Intel SBC 214 disc controller, and the bus 104 an Intel Minibus. The complete scanner controller, comprising the bus 104, the serial interface 102, the disk controller and driver 106, the communications controller 108, the digitizer 110 and the laser controller 112 may be a Technical Arts Corporation 100X Digitizer. The communications controller 108 is coupled to the robot controller 24 over a high speed serial interface, and also provides control signals to a sensor interface 122, which is part of the optical position sensing apparatus 18. The digitizer 110 provides a trigger signal to the robot controller 24 and receives video signals, provided by the cameras, by way of the sensor interface 122. The laser controller 112 provides galvanometer control signals to the sensor interface 122. The robot controller 24 responds to the trigger signals produced by the digitizer 110 by reporting its current X, Y Z and phi positions.

Figure 9:
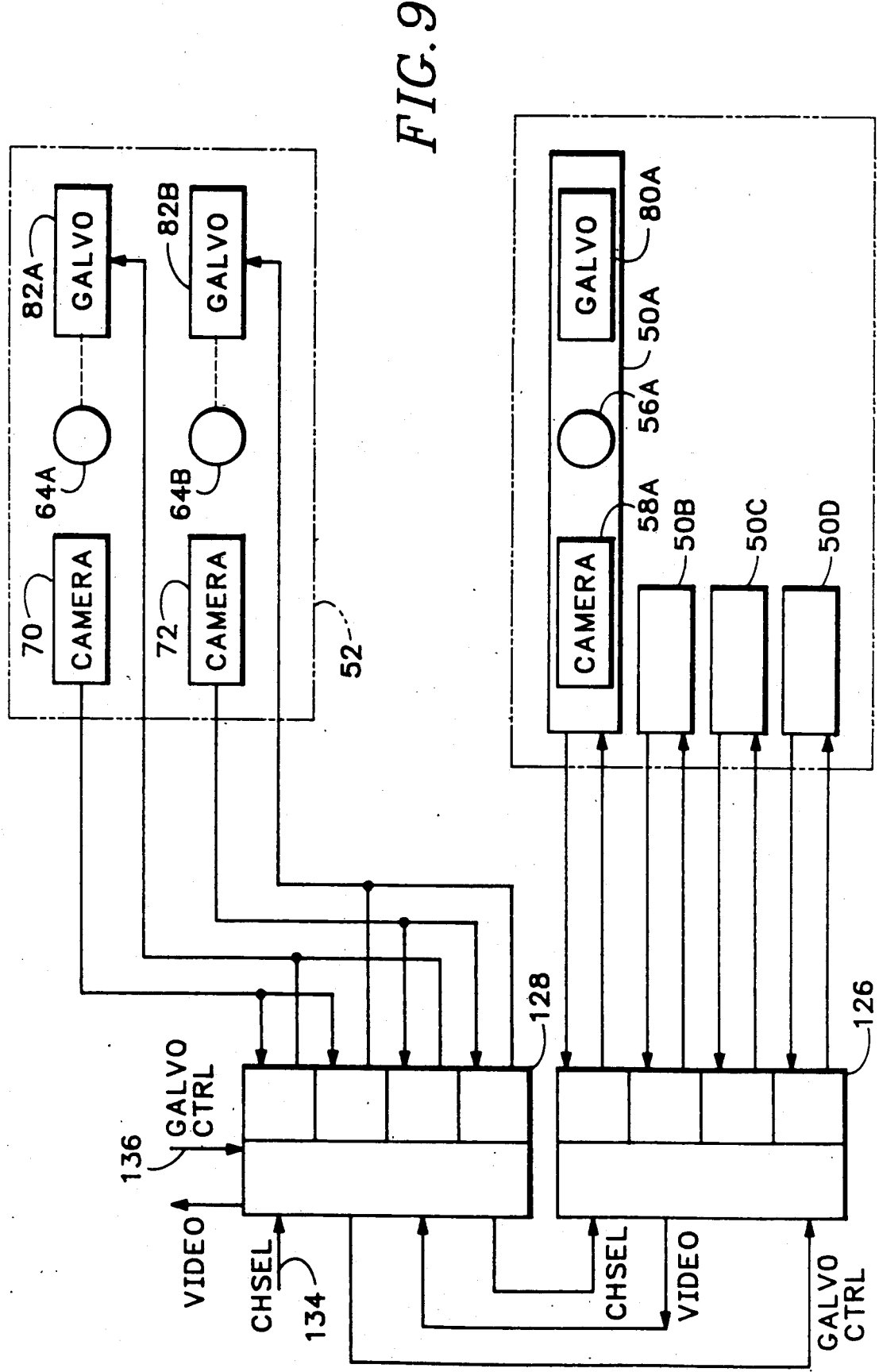
FIG. 9 is a block diagram illustrating the interface between the scanner controller and the optical scanning apparatus.

The sensor interface 122, which is also shown in FIG. 9, comprises two multiplexers 126 and 128 each having four channels which are independently selectable by a control signal provided by the communications controller 108 over a line 134. A further control signal selects either the multiplexer 126 or the multiplexer 128. The four channels of the multiplexer 126 are connected to the sparse scan position sensors respectively. Each channel of the multiplexer 126 has a video input connected to receive the video signal provided by the camera 58 of the associated sparse scan position sensor, and has a galvanometer drive output connected to the associated galvanometer 80. When the multiplexer 126 is selected, it selects the four video signals provided by the sparse scan position sensors sequentially and routes the selected signal to the digitizer 110. The multiplexer 128 is connected to the detailed scan position sensor 52 and allows selection, with each camera 70 and 72, of either galvanometer 82 in the sensor 52. The video signal provided by the selected camera 70 or 72 is applied by the multiplexer 128 to the digitizer 100. One or other galvanometer of the sensor 52 is selected in a manner described below.

When a given channel of a multiplexer is selected, a galvanometer control signal provided by the laser controller 112 over a line 136 is applied to the channel and generates the galvanometer drive signal that is applied to the galvanometer. The galvanometer control signal generated by the laser controller controls the galvo gain and offset. The gain controls the angle through which the laser beam is deflected in its beam plane, and hence the length of the scanned stripe on the table, and the offset controls the position of the stripe in the position sensor's Y' or Y" direction. The galvanometers that are connected to the multiplexer that is not selected assume a rest position, in which the beams are blocked from the mirrors by a protective shield.

The cameras 58, 70 and 72 supply clock signals, which are applied to the digitizer 110 through the interface 122, but the clock signal lines are not shown. The clock signals are used to synchronize operation of the galvanometers to the video signals provided by the cameras. The digitizer 110 places a stream of digital words on the bus 104 in response to the video signal provided by the multiplexer 126 or 128. A trigger signal is provided over a line 140 to the robot controller 24 at the end of each field of the video signal, in response to the vertical sync signal.

The robot itself comprises four servo motors 47X, 47Y, 47Z and 47∅, for bringing about linear motion along the X, Y and Z axes and rotation of the scan head 44 about a vertical axis, and linear encoders 48X, 48Y, 48Z and 48∅ for the four axes respectively. Thus, the robot controller provides drive signals to the servo motors 47 to bring about four axis movement of the robot, and receives data from the encoders 48 representing the position of the robot. The robot controller 120 latches a robot position vector, composed of the position values provided by the encoders 48, in response to the trigger signal received from the digitizer 110 at the end of each video field. The robot position vector is applied to the master computer 100 by way of the communications controller 108 and the bus 104. Therefore, for each video field, the master computer 100 receives a stream of video words from the digitizer 110, representing local (X', Y', Z') or (X'', Y'', Z'') coordinates extracted from the selected camera over its field of view, and a robot position vector representing a robot position. The local coordinates and the robot position vector received by the master computer are processed in order to yield information concerning the tube on the table.

Figure 10:
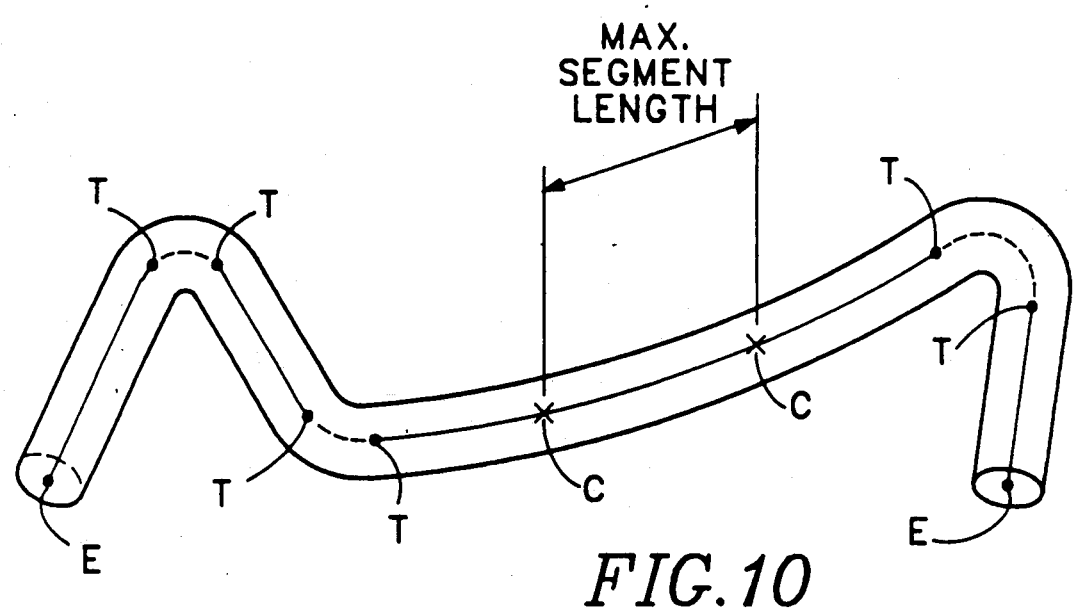
FIG. 10 illustrates a typical tube to be inspected.

A typical tube that is to be inspected is illustrated in FIG. 10. The tube has four legs which are joined by three bends. Three of the legs are seen to be straight, and extend between an end point E and a tangent point T, or between two tangent points T. The fourth leg is distorted by sagging, and is regarded as being composed of straight segments. Each segment extends between a tangent point T and a continuation point C, or between two continuation points C.

Before an inspection is carried out, it is necessary that the sparse scan position sensors and the detailed scan position sensors shall have been calibrated to determine the transformation from local (X', Y' Z') or (X'', Y'', Z'') coordinates into global (X, Y, Z) coordinates. Transformations are in the form of 4×4 homogenous transformation matrices. Different calibration procedures are needed for the sparse scan position sensors and the detailed scan position sensor. Calibration of the sparse scan position sensor is accomplished using a set of v-gauges and standard Technical Arts Corporation 100× calibration software. The operator mounts a different v-gauge on the table for each camera. The gantry is then moved to scan each v-gauge on the table. Each camera is calibrated separately and a corresponding calibration block is saved in the scanner disk memory.

Calibration of the detailed scan position sensor produces a 4×4 homogeneous transformation matrix for each camera 70, 72 with each laser 60A, 60B at each rotational position of the scan head. Using the appropriate matrix, linearized (X'', Y'', Z'') data from a laser-camera pair is converted to the global reference frame.

The operator mounts a special calibration gauge on the table in order to calibrate the detailed scan position sensor. To calibrate for 18 rotational positions of the scan head, the gauge comprises three tetrahedral figures, which are mounted on a single rectangular base. Each tetrahedral figure has three upper faces, each of which is a right triangle with its right angle at the apex, and a bottom face, which is an equilateral triangle lying in the X-Y plane. The length of any edge of this equilateral triangle is sqrt (2) times the length of an edge between two upper faces. The base is aligned, by positioning holes, with respect to the X and Y axes so that one of the upper edges of a first tetrahedron is in a vertical plane parallel to the X-Z plane. The relative orientations of the tetrahedrons is critical. The second tetrahedron is rotated 40 degrees clockwise (in the X-Y plane) relative to the first. The third tetrahedron is rotated 40 degrees clockwise (in the X-Y plane) relative to the second.

Each camera/laser pair is calibrated in each of eighteen positions. Since there are two cameras each operating with two lasers, a total of seventy two calibrations is required. A single calibration for a given camera, laser and rotational position involves a pre-determined sequence of gantry moves, interspersed with scans from the detailed scan position sensor. The Z-elevation of the scan head remains constant throughout the entire procedure; the gantry moves are X-Y translations.

Two types of scans are needed on the calibration gauge. The first type of scan, called an "upper-face scan," overlaps two upper faces of the tetrahedron. The second type of scan, called a "lower-face scan," overlaps an upper face and the X-Y base. The following sequence of X-Y translations, scans and rotations are needed for a full detailed scan position sensor calibration:

1. Select a rotational position and rotate the scan head to that position;
2. Select a laser;
3. Select a camera;
4. Move the scan head to a position such that the selected camera and laser are in position to scan the tetrahedral edge corresponding to the selected rotational position;
5. Collect a sequence of upper-face scans along the tetrahedral edge;
6. Move to a position such that the selected camera and laser are in position to scan the base edge of one of the faces scanned above;
7. Collect a sequence of lower-face scans along the base edge;
8. Repeat steps 4 through 7 for the other camera;
9. Repeat steps 3 through 8 for the other laser.
10. Repeat steps 2 through 9 for each of the other 17 rotational positions of the scan head.

The ATIS is able to inspect a tube that lies within a work volume having the same lateral boundaries as the table 30 and is 60 cm high. In order to carry out an inspection, the operator places a tube to be inspected on the table and positions it so as to minimize sag. It is not necessary to employ rigid fixtures to support the tube. However, compliant fixtures may be used if the operator observes excessive sagging. The tube need not be placed at a predetermined position on the table. Normally, the tube will be placed with its general length dimension substantially parallel to the length dimension of the table. The operator enters the tube number into the system via the operator terminal. Inspection of the tube takes place in two stages: a preliminary, or sparse, inspection and a detailed inspection. In the preliminary inspection, only the sparse scan position sensors 50 are used, and in the detailed inspection only the detailed scan position sensor 52 is used.

The preliminary inspection involves executing a preliminary scan, in which sparse scan data is collected using the sparse scan position sensors, evaluating the sparse scan data, and generating a path plan for the detailed inspection. The detailed inspection involves executing a detailed scan, in which detailed scan data is collected using the detailed scan position sensor, and evaluating the detailed scan data.

At the start of the preliminary inspection, the robot controller causes the motor 47X to move the gantry in the X direction to the home (X=0) position. The robot controller then causes the motor 47X to move the gantry from the home position towards the opposite end of the table in accordance with a predetermined program of acceleration, constant velocity and deceleration. The acceleration and deceleration of the robot should not be so large as to cause shocks that induce vibrations in the robot. The steady scanning speed is selected so that sufficient data can be collected. The position of the gantry in the X direction is detected by the encoder 48X, which provides an output signal to the robot controller 24. The scan head 44 is carried in its fully retracted position, 45 cm above the work volume, and accordingly there is no risk of a collision between the scan head and the tube except in the event of an egregious violation of the work volume by the tube being inspected. During the detailed scan, the scan head 44 is maintained at a stand off of 45 cm from the tube axis, and therefore the scan head can enter the work volume and there is a possibility of a collision between the scan head and the tube. A possible collision is identified if the horizontal component of the distance between a tube point in the top 15 cm of the work volume and a tube point in the bottom 15 cm of the work volume is less than the diameter of the scan head.

While the preliminary scan is in progress, the workstation controller retrieves tube model description from the data base. This model description, which may be in LRA or intersection point format, is converted to tangent point format and is provided to the scanner controller. (A model description in tangent point format is a sequence of points defined in x,y,z Cartesian coordinates in which each point is an end of a leg and may be either an end of the tube or the point at which a bend starts. The origin of the x,y,z coordinate system is chosen arbitrarily, except that all points in the model description are non-negative.) The model description might need to be transformed if, for example, the model description relates to a tube that is to be installed in the left wing of the aircraft and the production tube is to be installed in the right wing. The workstation controller constructs a mirror image of the model description received from the host computer. In order to carry out an inspection, the workstation controller issues the following commands to the scanner:

1. Start

This command causes the scanner to carry out a preliminary scan; if no additional command has been received when this scan is completed, the scanner suspends operation and awaits a further command.

2. Fit

This command can be sent while the scanner is still engaged in conducting the preliminary scan. The header block for the Fit command includes the tube diameter, the nominal bend radius, a tube material code, and the maximum allowable length of any segment (used for locating continuation points).

The Fit command is accompanied by a model description data block. The scanner uses the model description and the sparse scan data to build a preliminary description of the tube and a measure, "fit_error", of the accuracy of this description. The preliminary description has the same structure as the model description. If the preliminary description is adequate (specifically, if fit_error does not exceed a configuration parameter FIT_ERROR_THRESHOLD), the scanner controller executes a detailed scan, processes the data acquired, and reports the results. If the preliminary description appears to be inadequate, the scanner controller suspends operation and awaits a command from the workstation controller.

3. Scan

This command can be sent while the scanner controller is still engaged in conducting the preliminary scan or evaluating the data acquired in the preliminary scan. However, the results of the preliminary scan will be reported prior to reporting the results of carrying out this command.

The Scan command causes the scanner controller to use the current preliminary description to plan a path of movement of the scan head during the detailed scan such as to keep the tube within the field of view of the selected camera 70 or 72 while avoiding collisions. When a path of movement of the scan head has been planned, the scanner carries out a detailed scan of the tube, and reports the results as a detailed description. This despite the fact that fit_error may exceed FIT_ERROR_THRESHOLD. But if fit_error exceeds a higher REFUSE_TO_SCAN_THRESHOLD, the scanner controller will not carry out a detailed scan and will report null results. The detailed description defines the actual configuration of the tube that lies on the table. The detailed description is similar to the model description and the preliminary description except that it may include continuation points, labeled as such.

After the Scan command has been executed, and while the scanner controller is idle, the workstation controller may, automatically or in response to an operator command, compare the detailed description, adjusted if necessary to eliminate the continuation points, with the model description in order to determine whether the production tube matches the prototype tube sufficiently closely. If the match is not within a preset tolerance, the tube bending data is adjusted in known manner such as to improve the match.

4. Halt

Causes the robot to come to a halt, stopping all motion, turning off the laser, and ceasing all computations. All activity except the monitoring of the scanner controller/workstation controller interface remains halted until a Continue or Reset command is received.

5. Reset

Causes the ATIS to discontinue any operations in progress, return the gantry to its home position, and cease activity, awaiting a new command.

6. Calibrate

Causes the robot to move to the calibration station and carry out a system calibration. The outcome is indicated by a message ("no fault" or "calibration failed") passed to the workstation controller in response to the next Report Status command. Following calibration the robot remains at the calibration station, awaiting the next command.

7. Re-Transmit

Transmitted in the case of a transmission error, this command causes the scanner to re-transmit its most recent response.

8. Report Status

The workstation controller issues this command in order to ascertain the state of and any error conditions in the scanner. The scanner responds by sending state and error messages. The Report Status command is transparent to the other command sequences, i.e., when the scanner has suspended operation and is awaiting a command the scanner's status is not affected by its receipt of and response to Report Status commands.

All responses provided by the scanner consist of a fixed length response block optionally followed by a variable length data block. The responses have the following format:

The first two bytes identify the particular response (Data Received, preliminary Description, Detailed Description, or Status).

The third and fourth bytes give the current state of the scanner.

The fifth and sixth bytes transmit the error message.

The seventh and eighth bytes are used in the Preliminary Description responses to transmit fit_error (a number in the range 0 to 99) and in the Detailed Description response to transmit the number of a bad leg (0 to 31; 99 is used to indicate more than one bad leg).

The ninth and tenth bytes carry the number of the last command received from the workstation controller.

The last six bytes give the number of records in the data block which follows.

The responses, as identified by the first two bytes, include:

1. Data Received

Issued in response to a Fit command. The error message (in the fifth and sixth entries) will indicate a transmission error.

2. Preliminary Description

Accompanied by a data block containing a preliminary description. If a poor fit is achieved, the cause, if known, is indicated by the error message. The sixth and seventh bytes give the fit error, the measure of the accuracy with which the preliminary description fits the preliminary scan data.

3. Detailed Description

Accompanied by a data block containing a detailed description. Any errors in the Path Planning or Analysis routines will be indicated in the error message. When a bad segment is included in the data block, its number is given in bytes seven and eight.

4. Status.

Issued in response to the Report Status command. As with all responses, the third and fourth entries in the response block report the current state of the scanner, and the fifth and sixth report any error message.

The software used to control the ATIS has five main units: Executive, Scan Functions, Localization, Path Planning, and Analysis. The ATIS software makes extensive use of configuration parameters to implement subjective values (large gaps, approximately collinear points, adequate preliminary description, etc.).

Figure 11:
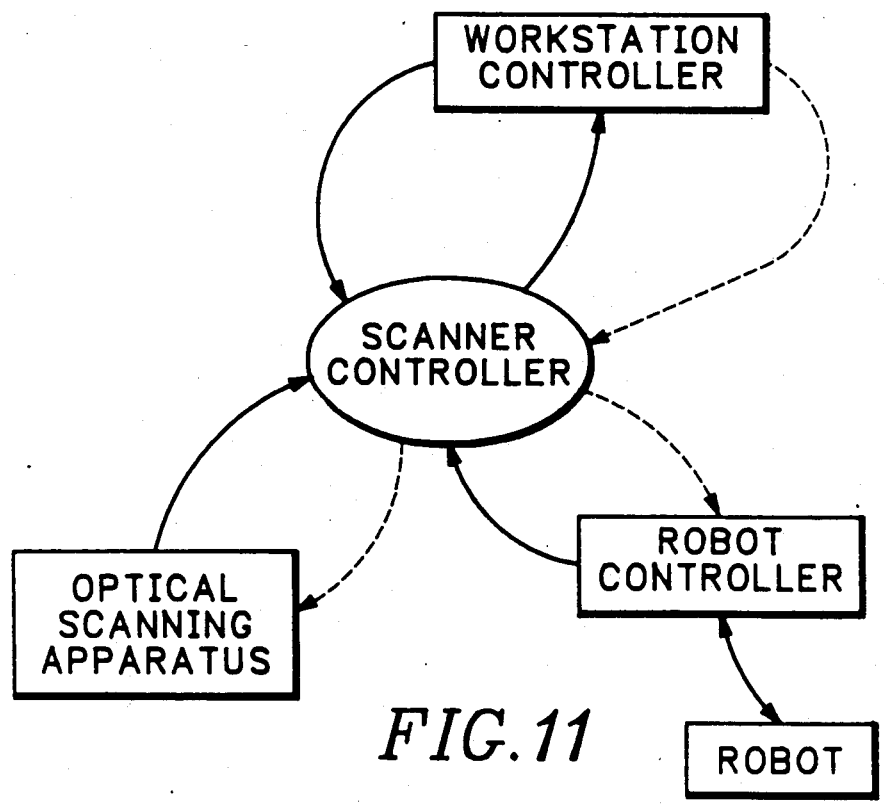
FIG. 11 illustrates command and data flow in the automated tube inspection system.
Figure 12:
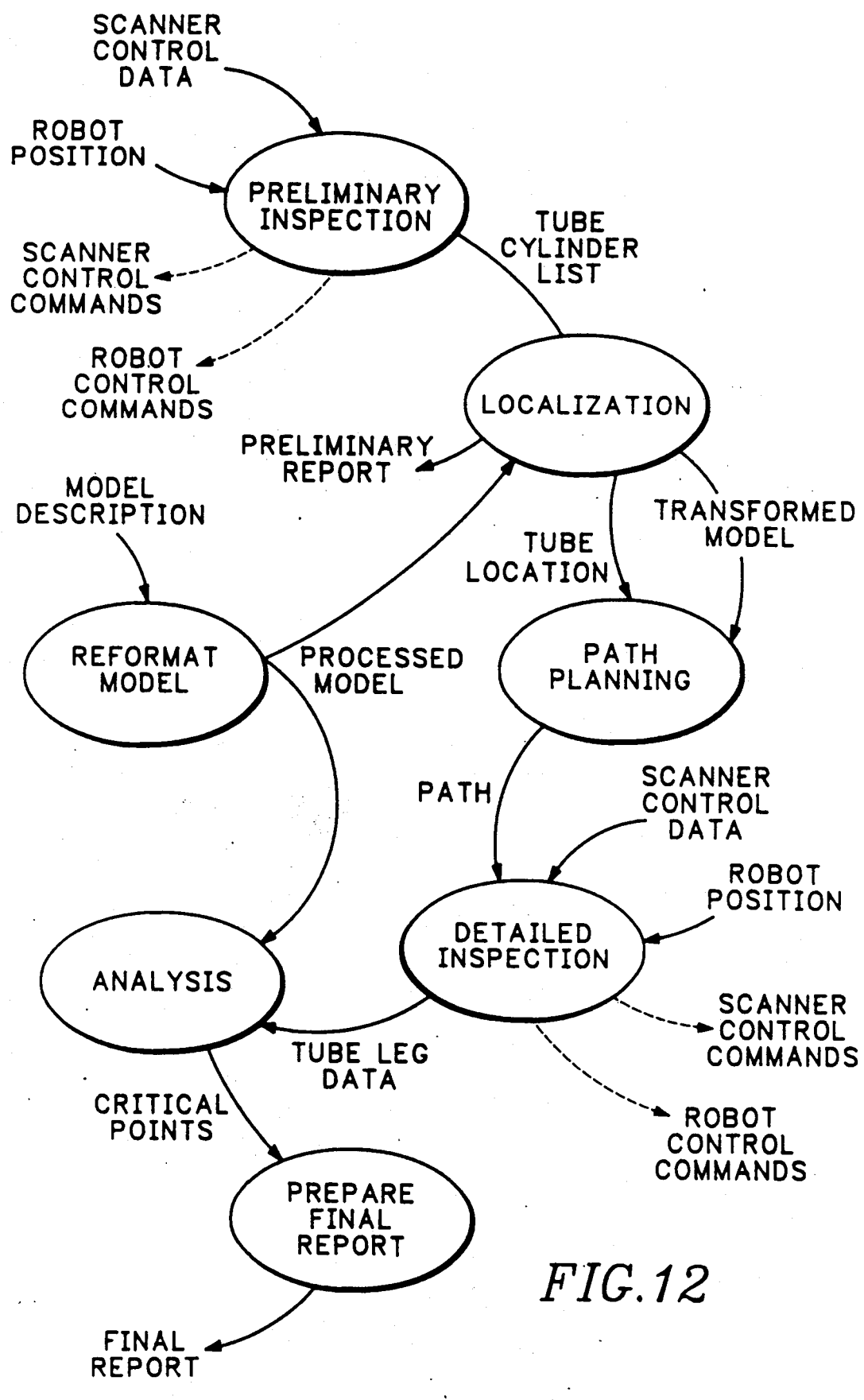
FIG. 12 illustrates command and data flow within the scanner controller.

Executive occupies the master computer and operates in parallel with the other four software units. During the preliminary inspection, Scan Functions is followed by Localization which is in turn followed by Path Planning. In the detailed inspection, multiple copies of Scan Functions and Analysis may operate in parallel on the optional slave computers 105 and work on separate legs of the tube. The ATIS software is diagrammed in FIGS. 11 and 12.

Executive handles all communications between the scanner and the workstation controller; it formats the data received from the workstation controller for use by the Localization, Path Planning and Analysis routines; it coordinates the acquisition and calculation of tube measurements; and it formats and reports the results of those measurements to the workstation controller.

Scan Functions utilizes the robot and position sensor subsystems to collect scan data for a succession of scans (a "leg"), and carries out preliminary processing of this data. This data is stored as Tube Scan Data for use by Localization (in the case of a preliminary inspection) or Analysis (in the case of a detailed inspection). Scan Functions is called by Executive which passes as parameters the path to be followed and the type of inspection (preliminary or detailed) to be conducted.

Localization and Path Planning function during the preliminary inspection. Localization processes the Tube Scan Data and creates hypothetical tubes which it compares against the description of the tube provided by the workstation controller. The best match is used to determine the location and orientation of the tube on the work surface. This information is passed to Path Planning which creates a path to be followed by the robot when carrying out the detailed inspection. Localization is called by Executive and calls in turn Path Planning. The path produced is reported to Executive.

Analysis is active during the detailed inspection. When a straight section of the tube is being scanned, Analysis processes the Tube Scan Data produced by Scan Functions to determine the location of the axis of the leg (or, in the case of a sagging tube, of several segments of a leg); for the first and last legs it also determines the location of the corresponding ends of the tube. When inspecting a tube that has a "large bend" (a bend over 120 degrees) additional information is obtained to permit determination, in Executive, of the location of points marking the beginning and end of the large bend.

The various software units of the scanner controller will now be described in greater detail.

EXECUTIVE

Executive is the software unit that controls the function of all other ATIS software units. It is the main routine which interfaces to the workstation controller as well as the slave computers. Executive contains the high level logic used to coordinate ATIS operation. Executive arbitrates the work load of scanning/analyzing during the scan phases of the tube inspection. Therefore, the slave computers do not have to determine what functions to perform, but receive commands from Executive instructing them what to do and when to do it.

There are two major functions of Executive: coordination and communication.

Coordination

Executive coordinates and controls the execution of lower level software modules via data driven interfaces. Therefore, the lower level modules are activated by data, not by control.

Communication

Workstation controller commands, and other internal signals, are handled by Executive. This is accomplished with use of inter-task communications and message passing routines. The communications are asynchronous when background servicing is required. Input and output data buffering are used to reduce data transfer overhead.

Communications to the optional slave computers may be accomplished via dual ported RAM. The three computers share memory regions on the bus 104 and semaphore locks are utilized to organize access to data regions. The master computer and the two slave computers may each read/write from/to dual ported RAM.

In addition to the major functions of coordination and communication, Executive carries out service routines that involve data used or provided by more than one processor. The routines are labeled Process_Model, Prepare_Report (which includes Tangent_Points) and Check_Segmentation. Process_Model processes the model description as it is received from the workstation controller to create the Tube Model used internally. The Tube Model comprises the following variables:
tube_diameter
bend_radius;
n_legs; and for leg=1 to n_legs first_end(leg),
last_end(leg),
direction(leg), and
mlength(leg).

Prepare_Report determines the location of tangent points and formats the results, along with the continuation and end points determined by Analysis, as the Detailed Description of the production tube.

Imagine the tube to be shrunk until its diameter becomes zero and the tube itself becomes a path in space, i.e., line segments representing the legs joined by curves representing the bends. This is the axis of the tube, and the positions of the endpoints of the line segments are what is reported to the workstation controller. The points where the line segments join the arcs of the bends are the tangent points.

Tangent_Points is entered with a pointer to a pair of adjacent legs whose axes have been located by Locate_Axis (part of Analysis), and determines the end point of the axis for the first leg and the starting point for the axis of the second leg. Two different approaches are used depending upon whether the angle between the legs is "small" or "large". (Angles are defined such that a straight section "bends" at an angle of 0 degrees while an angle of 180 degrees connects two parallel but distinct legs.) An angle is classified as small if it is less than LARGE_ANGLE_THRESHOLD, a configuration parameter which is set, initially, at 120 degrees. Tangent_Points accordingly includes two subroutines: Tangent_Points_Small_Bends and Tangent_Points_Large_Bends.

For small angles it is assumed that the bend is circular. Under this assumption the known radius of the bend ("bend_radius" in the Tube Model) can be used to calculate the tangent points, as follows:

Let A and A' be the two axes, as determined by Locate_Axis, of the first and second legs, respectively;

Let N be the shortest line segment which connects A with A';

Let P be the plane normal to N which contains A; and

Let A* be the projection of A' along N onto P.

If the extensions of A and A* intersect, then they enclose a wedge of less than 180 degrees. Select points E on A and S* on A* which are each a distance R from some point Q in that wedge. E is the end point of A and the pre-image S of S* is the starting point of A*.

For larger bends the assumption that the bend is circular is no longer valid and even if it were, the possible error in the calculation of tangent points used for small bends becomes large. Consequently a different method of determining the end points of legs is required. It is not necessary that the calculation produce the literal tangent point, since the calculation of tangent points is recognized as being error prone even in the case of small bends, and consequently the values of the tangent points are not given much weight. What is required is a consistent method which can be reversed (by the workstation controller) without loss of information.

The points calculated, called pseudo-tangent points, are the tangent points in the case of circular bends but not otherwise.

Figure 13:
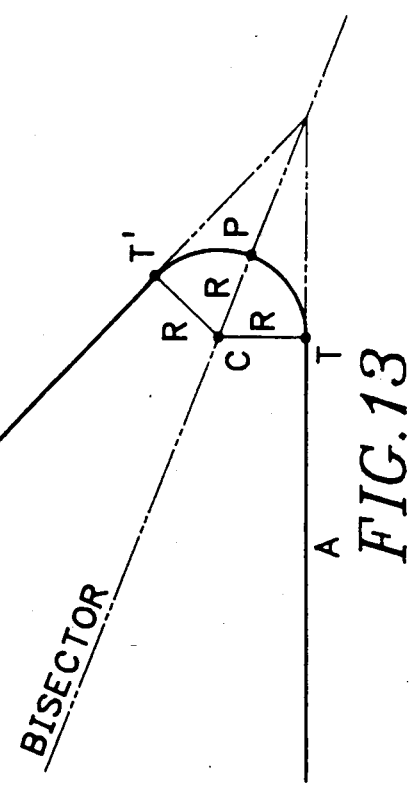
FIG. 13 illustrates how tangent points are calculated for typical bends.

Referring to FIG. 13, let A and A' be the two axes adjacent to a large bend and for simplicity assume that A and A' are co-planar. Let B be the bisector of the angle formed by A and A' (or in the case where A and A' are parallel, the line midway between them) and let P be the point on the intersection of B with the axis of the bend. Finally, let R be the nominal radius of the bend (the radius of the die that was used to make the bend).

In reasonable cases (e.g. bends that can be made on the bending machines) there will be a unique point C which is a distance R from each of A, A' and P, and hence unique points T on A and T' on A' from which this distance is measured. These are the pseudo-tangent points; in the case of a circular bend they are the actual tangent points.

In order to determine the location of pseudo-tangent points for large bends, a special scanning pass is made over the bend section and the position of the extreme point (labeled P in FIG. 13) is calculated. Scan data is collected transverse to the bisector as the scan head is carried parallel to and above the bisector. (The position of the bisector is determined from the positions of the adjacent axes as reported by Localize. If the axes are parallel, the line midway between them will be used. The scan head is oriented so that the lasers trail the camera as they approach the tube. Scanning is halted after tube data has been acquired on several successive scans and the location of the first tube data point in a small strip parallel to the bisector is determined. The extreme point is calculated as offset from this point by one tube radius in a direction into the tube and parallel to the bisector.

Individual scans at the ends of legs will typically contain points both from the leg and from the adjacent bend. By a more expansive use of the dot product algorithm used (in a manner described below) to determine the axis directions it is possible to identify those points in such a scan which lie on the leg. Discarding the points from the bend sections, these shortened scans can then be used to establish the location of the tangent points just as the partial scans at the ends of tubes are used to locate the tube ends.

The tangent points are used to check the accuracy of the end markers set by Discard_Bends (part of Analysis); once the two end points of a leg have been located, Check_Segmentation counts how many scans beyond the ends were included in the leg (reported as a positive integer) or how many scans in the leg were not used (reported as a negative number). An error message is generated if it is found that more than TOO_MA-NY_SCANS_EXCLUDED usable scans were discarded. Inclusion of bend scans will not be signaled as an error; Locate_Axis (part of Analysis) checks and discards any end scans which significantly alter measurement of the location of the axis. Thus even if a bend scan is included, it will not be one that has a significant impact upon the results.

SCAN FUNCTIONS

Scan functions comprises the following routines:
Acquire_Sparse_Data
Filter_Sparse_Data
Transform_Sparse_Data
Refine_Sparse_Data
Split_Scans
Build_Cylinder_Hyps
Start_Hyps
Components_Compatible
Find_Center
Acquire_Detailed_Data
Initiate_For_Scan
Collect_Scan_Data
Collect_Position
Filter_Detailed_Data
Transform_Detailed_Data
Refine_Detailed_Data
Motion_Compensation
Filter_Scans_Vertically.

Acquire_Sparse_Data moves the gantry to its home position and then sets it moving in the X direction. Acquire_Sparse_Data then directs the collection and processing of the scan data from the sparse scan position sensor, and collects the X-axis gantry position for each field of each camera. This data is passed directly to Filter_Sparse_Data.

Filter_Sparse_Data identifies data from the worksurface (as any points below a certain thres-hold height) and discards them, passing the remaining points as raw_data to Transform_Sparse_Data. The presence of tube data is monitored by Filter_Sparse_Data, and once the gantry has passed beyond the end of the tube (as indicated by two scans with no tube data following two scans with tube data), the gantry is halted and Executive is notified.

Transform_Sparse_Data linearizes and transforms the raw_data received from Filter_Sparse_Data into the global coordinate system (X,Y,Z) and stores the results in tube_data. The transformation is a conventional three-dimensional transformation followed by a translation.

Refine_Sparse_Data distinguishes tube_data from data deriving from supports, and filters out spikes. It also discards tube_data that may have been corrupted as the result of partial occlusion by a different portion of the tube.

The cosine of the maximum allowable elevation angle for a leg of a tube is given by the configuration parameter COS_BLOCK_TOL. Hence the maximum distance between the top and the bottom of a vertical cross section of the tube is given by leg_depth-=tube_diameter/COS_BLOCK_TOL. Refine_Sparse_Data calculates leg_depth, locates the highest point in a scan, and discards any point more than (leg_-depth)/2 below the highest point.

The following pseudocode describes the operation of Split_Scans:

```
Identify connected components
For each scan across table
    For each sensor point along scan
        If point is close to existing cluster
            Add point to cluster
            Update cluster center
        Else
            Initialize new cluster
            Cluster center is first point
        End for
    End for
For each identified cluster
    Classify as "large", "fragment" or "extraneous"
End for
End..
Merge fragmented clusters
Loop
    If two nearby clusters are separated by
    extraneous cluster,
        Delete the extraneous cluster
        Merge the other two clusters
        Update the combined center as weighted avg
        If the resulting cluster is sufficiently large
            Classify merged cluster as "large"
        Otherwise
            Classify merged cluster as "fragment"
    Exit if no more merges possible
    End loop
For each cluster
    If the cluster does not contain a significant
    number of scanned data points,
        Delete all data covered by this cluster
    End for
End.
```

Build_Cylinder_Hyps groups together components from successive scans whose centers are approximately collinear. These groupsings become the data cylinders which are later matched with the cylinders of the model. The data cylinders are data structures each consisting of an axis direction, two endpoints, and a length.

As the data cylinders are being built, a test axis direction is calculated between components in adjacent scans. the axis direction of the data cylinder is computed by averaging the test axis directions between components in the cylinder.

The endpoints are calculated as the centers of the first and last components in the data cylinder. If there are few points in a component, because the diameter of the tube is small, the center produced by Split_Scans is used. Where more points are available, a more sophisticated calculation, similar to that described below under the heading Locate_Axis, is used. The length of the data cylinder is just the distance between the endpoints. Since the endpoints are calculated independently of the axis direction, the direction of the line joining the endpoints might not coincide with the axis direction.

From the foregoing it is evident that what is needed from the component data to form a data cylinder is the first component, the last component, and the average of the test axis directions. This information, along with the number of components involved (used to discard very short cylinders) is produced by a process which "grows" the cylinders by adding components from successive scans.

As new components are added to the cylinders, the cylinders may split into two or more cylinders or distinct cylinders may join, so the structure emanating from an initial component is a graph composed, possibly, of many cylinders. The following pseudocode describes Build_Cylinder_Hyps:

```
Identify hypothetical cylindrical sections
Clear cylindrical section list
For first scan line
    Hypothesize a cylinder for each isolated point
For all subsequent scan lines
    For each point along scan line
        Attempt to associate with existing cylinder
        If none found,
            Initialize a new cylinder hypothesis
        Else
            Add the data to cylinder group
            Update the cylinder axis direction
            Update cylinder length and end data
    End for
    For each cylinder hypothesis
        If cylinder was not extended
            If cylinder was not sufficiently large
                Add cylinder data to cylinder list
            Else remove cylinder data
                Remove cylinder from hypothesis list
        End for
End for
End.
```

Initiate_For_Scan moves the robot to the starting position of the detailed scan, calculates the desired velocity profile and initiates the scan. The velocity profile for the detailed scan is selected on the axis of the same criteria as that for the preliminary scan. Since the robot is potentially moved along all three linear axes (X, Y and Z) during the scanning of a leg of the tube, the velocity along each axis must be coordinated with the velocities along the other two axes in order to follow the desired path. Since a different mass is moved along each axis, each axis has its own acceleration and deceleration limits that must not be exceeded. During the detailed scan, it is desirable to produce data traces that are spaced apart along the tube by no more than about 0.63 cm. A digitization rate of 30 scans/second (every other camara frame) and a travel rate of 7.5 cm.s produces data traces spaced about 0.25 cm apart on the tube surface.

Collect_Scan_Data collects the detailed scan data from the detailed scan position sensor and passes it to Filter_Detailed_Data.

Collect_Position collects the robot positional data for each scan and stores it for use by Transform_Detailed_Data and Motion_Compensation. Each camera scan produces a trigger pulse from the digitizer that commands the robot controller to read the robot positional data and transmit the data over the high speed serial interface to the scanner controller. The positional data for all four axes (X, Y, Z and phi), is represented by the number of encoder counts from the home position and must be converted, by Collect_Position, to the real position according to the lines per revolution and the pitch of the mechanical system. The robot position is correlated with the scan data to give a complete picture of the scan data acquired and the position of the data.

Filter_Detailed_Data performs the same functions as does Filter_Sparse_Data except that worksurface points are flagged rather than discarded, thus preserving the Y" coordinates of these points for use by Refine_Detailed_Data and Motion_Compensation.

Transform_Detailed_Data transforms the raw_data that was not flagged by Filter_Detailed_Data into the global coordinate system. The transformation is a conventional three-dimensional transformation followed by a translation; the additional rotation which would ordinarily be required is built into the calibration. The separate calibration at each rotational position speeds the transformation and increases the accuracy of the results.

Refine_Detailed_Data performs the same functions as does Refine_Sparse_Data except that leg depth is calculated using the cosine of the actual elevation of the leg, as determined by the Localization routines. This routine also performs some additional functions. During processing of the scan data the Y and Z values of the highest (non-spurious) point in each scan are stored, for use in detecting vertically displaced scans.

After proceeding as in Refine_Sparse_Data, Refine_Detailed_Data has discarded all points except those deriving from the highest section of tube in view. Generally this will be the leg that is being tracked, but points from other parts of the tube will be included (a) when another part of the tube is in the field of view alongside the leg being scanned, at approximately the same height, or (b) when another part of the tube crosses above, or at least is significantly higher than, the leg being scanned.

Refine_Detailed_Data adjusts the flags pointing to the beginning and end of the scan data so as to eliminate points arising from case (a). Points arising from case (b) are treated later after all of the scans of a leg have been processed.

The maximum number of pixels in a scan of a single straight section of tube is (N_PIXELS_HOZ * D) / FOV * COS where N_PIXELS_HOZ is the number of pixels in one row of the camera array, D is the tube _diameter, FOV is the camera field of view and COS is the cosine of the angle, as reported by Path Planning, between the X"-axis and the azimuth of the direction of the leg. Refine_Detailed_Data calculates max_pixels as this number plus DELTA_PIXELS and discards any scans (by setting their starting and ending pointers to −1) that contain more than max_pixels tube data points. The number of tube data points is calculated as simply the end minus the start plus one, i.e., intermediate non_tube points are included.

Since the tube data points are acquired by illuminating the tube with a laser beam that is reflected from an oscillating mirror, each data point is acquired at a slightly different time from its neighbors. Since the detailed scan position sensor is moving, this time difference corresponds to a difference in the position from which the data point was acquired. For the purposes to which the preliminary inspection data is put, this difference is insignificant and is ignored. However, for the detailed inspection it is significant and must be taken into account. That is the purpose of Motion_Compensation.

The angular velocity of the galvanometer varies in approximately sinusoidal manner with a frequency of 60 Hz, triggered by the camera clock. The data may be treated as if the velocity varied linearly with time by either adjusting the galvanometer drive waveform or mapping it. The time between the latching of position data by the robot controller and the acquisition of the first pixel of data is determined experimentally and provided as the configuration parameter GALVO_SWEEP_DELAY. Similarly, the time between the acquisition of the first pixel and the acquisition of the last pixel is determined and provided as GALVO_SWEEP_DURATION. By interpolation, the delay for each pixel can be calculated.

Processing of scan data by Motion_Compensation is delayed, if necessary, until the robot position data for the next scan is available. The position data for the next scan is used in conjunction with the position data for the current scan to calculate the average velocity components along the X,Y and Z axes. These velocity components, multiplied by the delays discussed above, give the adjustments for each pixel. The pixel data, with the adjustments added, are stored in tube_data.

Filter_Scans_Vertically fits a line through the highest points in each scan (in the Y-Z plane), and any scans whose highest points lie more than tube_diameter/2 above the line are discarded (i.e., the pointers to the first and last tube data points in the scan are both set to −1).

LOCALIZE

Localize determines the location and orientation of a tube on the work surface from preliminary inspection data and a "model" of the tube. The model is a list of cylinders containing, for each leg of the tube, the endpoints, direction and length of the leg. The list of model cylinders is calculated by Executive from the Model Description. The direction and length are redundant but are used by other routines and hence are calculated by Executive and stored as global data. The accuracy of the matching of the preliminary inspection data to the model is controlled by error constants which may be altered as configuration parameters.

Figure 14:
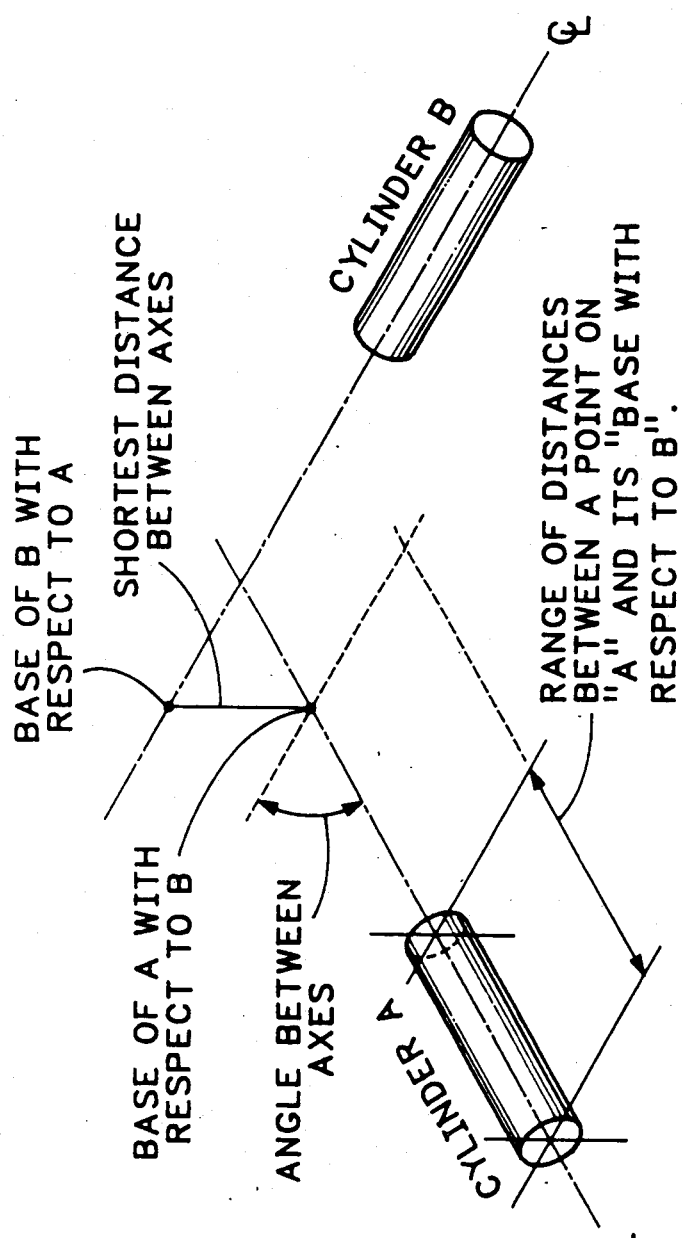
FIG. 14 illustrates relationships between a pair of non-parallel cylinders.

A list of data cylinders is provided by Build_Cylinder_Hyps. Localize computes a transformation which carries the model cylinders into alignment with the data cylinders: the coordinate information contained in the model is thus transformed into information about the end and tangent points of the tube being inspected. Such a transformation can be computed if the data cylinders to which any two non-parallel model cylinders correspond are known. In fact, even if the correspondence is known there may still be ambiguity as to how they are to be aligned, and therefore there can be up to four transformations. The process for finding matches between pairs of model cylinders and pairs of data cylinders proceeds as follows. Certain relationships between pairs of non-parallel cylinders drawn from the same list (i.e., the list of model cylinders or the list of data cylinders) are tabulated. These relationships are listed below and illustrated in FIG. 14.

the angle between the axes;

the shortest distance between the lines containing the axes; and the range of possible distances between a point on a cylinder and its "base". (The point on a cylinder's axis nearest to the axis of the other cylinder is its base with respect to that other cylinder).

the "orientability" of each cylinder with respect to the other. A cylinder is defined to be orientable if its base lies well outside the cylinder. (Orientability is used, when available, to reduce the number of transformations from four to two if one cylinder in the pair is orientable and to one if both cylinders are orientable.)

Pairs of cylinders that are nearly parallel are not used because the base points do not exist (if they actually are parallel) or can only be determined with considerable error.

These relationships between pairs of cylinders from the same list are used to match pairs from one list with pairs from the other. A pair of model cylinders is matched with a pair of data cylinders provided:

the angles between their axes are about the same;

the shortest distances between their axes are about the same;

the range of possible distance values for the model cylinder includes, or almost includes, the range of possible distance values for the data cylinder; and they agree as to orientability.

Each match of a pair of model cylinders with a pair of data cylinders is used to generate the four transformations that carry the model cylinders onto the matching data cylinders. The transforms of cylinders A and B onto A' and B' respectively, are computed so that they:

carry the midpoint of the line connecting the bases of A and B (with respect to each other) to the midpoint of the line connecting the bases of A' and B'; and align the axis of A with the axis of A' and the axis of B with the axis of B', splitting the difference to the extent that the angle between the axes of A and B differs from the angle between the axes of A' and B'.

If one or both of the model cylinders are orientable, the number of transformations is reduced to two or one.

Each of the transformations produced above using a pair of model cylinders is evaluated by applying it to transform the remaining model cylinders. These transformed cylinders are checked to see if they come close to coinciding with (or containing) any data cylinders. For each transformation two lists are produced, one of the model cylinders that roughly coincide with data cylinders, and one of the data cylinders that are thus accounted for.

The transformation that produces the longest list of coinciding model cylinders is selected as the best. If there is more than one such, the one that accounts for the greatest number of data cylinders is selected.

The selected transformation is further refined by averaging each of the compatible transformations produced by the cylinder pairs that it brings into coincidence. This final transformation is checked to ensure that the distance between the data cylinders and the transformed model cylinders is always less than a tube diameter. If this is found not to be the case, the Localize function cannot be completed and an error condition will be reported to the workstation controller. If the results of the test are satisfactory, the Localize function is completed and the final transformation is reported to Path Planning as the tube location.

Localize thus proceeds as follows:

a list of data cylinders is received from Build_Cylinder_Hyps;

the model data is received from Process_Model as a list of model cylinders;

the described relationships between pairs of hypothetical axes are computed and tabulated;

the hypothetical axes are matched with axes of cylinders in the tube model and a list of proposed tube locations is developed, together with lists of the cylinders that they successfully match;

the proposed location that best matches all of the data from straight sections is selected and refined to give the estimated tube location, which is passed to Path Planning.

the cylinder list and tube location are processed to produce a preliminary tube description which is passed to the Executive.

These steps are performed by:
Load_Model;
Build_Constraint_Tables;
Find_Legal_Locations;
Select&Refine_Location; and
Write_Prelim_Desc.

Load_Model

Localize processes two lists of cylinders; those derived from the model and those derived from the data. In this context a cylinder is two endpoints, an axis direction, and a length. For model cylinders, the axis direction is the direction of the vector from the first endpoint to the second endpoint. For data cylinders the axis direction is calculated separately from the endpoints and will generally differ from the directions of the line joining them; even should they coincide, the data cylinder's axis direction is directed from the first scan in which the cylinder appears toward the last scan in which it appears. This may or may not agree with the direction of the axis of the corresponding model cylinder.

Build_Constraint_Tables

In preparation for matching the model and data cylinders, Build_Constraint_Tables creates a list of the values of relationships between pairs of cylinders tabulated for each set of cylinders. The following pseudocode describes Build_Constraint_Tables:

---
Construct Shape Property Tables
For each cylinder in cylinder list for scanned tube
    Compute relational properties of cylinder pairs:
        Angle between axes
        Shortest distance between axes (co-planarity)
        Distances from point where axes are closest
            First end
            Second end
        Location where axis lines (nearly) cross
        Whether shortest distance occurs beyond ends
        Whether the pair is suitable for constructing
            a tube position hypothesis from this pair
    Add properties to property array
For each straight section of the model tube
    Construct a similar relational properties list for the model tube.
End.

---

Find_Legal_Locations

For the time being the data and the tube model are each viewed simply as collections of related cylinders; data from the bend sections is disregarded. A "location" in this context is position and orientation of the tube model. Locations are described by the matrix of the transformation (a translation plus a rotation) which carries the tube model from its canonical location to the location being described. A location which brings about the best (among those considered) correlation of the data with the model is produced as follows:

Each pair of cylinders in the model is compared with each pair of cylinders in the data to see if their constraints (the values listed in the tables built by Build_Constraint_Tables) are "consistent", i.e., in approximate agreement.

For sets of pairs whose constraints are consistent, up to four location hypotheses are created (As explained above, if both cylinders are non-orientable the pairs can be matched in four different ways.) and the corresponding transforms calculated.

Each location is tested to see how many model cylinders and how many data cylinders it accounts for. Parallel pairs are not used at this stage.

The pseudocode for these steps follows:

---
Build Position Hypothesis List
Start with empty position hypothesis list
For each pair of cylinders in scanned tube list
    Skip this pair if not compatible for
        constructing position hypothesis
    For each pair of cylinders in model tube
        having similar relational properties
        Assume that the scanned tube cylinders
            correspond to the straight sections
            of the model
        Determine coordinate transformation to
            best align model tube pair to
            scanned pair
        Determine percentage of "model" tube
            straight length which is "covered"
            by some cylinder of the reoriented
            scan data
        If "coverage" level is sufficiently large,
            add position hypothesis and goodness-of-fit
            measure to position hypothesis list
    End for
    End for
End.

---

Build Path Hypothesis List
While a position hypothesis exists in position
    hypothesis list
    Select the first available hypothesis
    For each of the remaining hypotheses
        If orientations are very similar
            Compare the goodness-of-fit
            If the second fit is better
                Select the second hypothesis
                Delete the first hypothesis from list
    End for
    Place currently-selected hypothesis in path
        hypothesis list
    Delete current position hypothesis
End while
End.

---

Select&Refine_Location

We compare location hypotheses hyp1 and hyp2 by defining hyp1 to be larger than hyp2 if it finds matches for more model cylinders or the same number of model cylinders but more data cylinders, i.e., hyp1>hyp2 if;

n_ver_mcyls(hyp1)>n_ver_mcyls(hyp2), or n_ver_mcyls(hyp1)=n_ver_mcyls(hyp2) and n_ver_dcyls(hyp1)>n_ver_dcyls(hyp2).

The largest location hypothesis is selected and then refined by averaging the previously calculated locations associated with each pair of model cylinders which are matched to data cylinders by this largest location hypothesis. The result, tube_location, is verified by checking that the distance between the centroid of each scan component and the nearest leg axis is less than the radius of the tube.

Write_Prelim_Desc

The tube_location maps the model cylinders to the data cylinders (or some of the model cylinders to some of the data cylinders) and hence establishes a relationship between endpoints in the model and endpoints in the data. This relationship is used to transfer the linear order of the model endpoints to the data endpoints and this ordered set, formatted as a Cartesian model, is passed to Executive as the preliminary description.

This routine also calculates a measure of the accuracy with which the preliminary inspection data fits the model and this "fit_error" is passed in the header of the preliminary description for use by Executive and/or the workstation controller in determining whether to proceed with the detailed inspection.

For each model cylinder mcyl that is not matched to a data cylinder, the image of axis(mcyl) under tube_location is calculated and the cosines of the azimuths of these images are summed. (Since the sparse scans are perpendicular to the X-axis, the nearer a cylinder is to being perpendicular to the X-axis the more likely it is to be missed. Thus, the cosine of the azimuth provides a reasonable estimate of the likelihood that a cylinder will be missed.) Call this sum S.

Unmatched data cylinders may be composed of scans which are also contained in matched cylinders or scans from bend sections; hence they provide a poor measure of fit. Unmatched scans, since they will include scans from bends, also provide a poor measure of fit. Call D the sum of the number of scans in unmatched data cylinders and the number of unmatched scans. Then:

fit_error=S+D×(FIT_ERROR_WEIGHT).

PATH PLANNING

The design of the Plan_Path function is based on the description in T. Lozano-Perez and W. E. L. Grimson, Tracking Tubing in Range Data, MIT Artificial Intelligence Laboratory.

Given a localized model, Path Planning plans an optimal path for the scan head. This path defines the translational moves for the gantry, the Y axis transport and the scan head that are used to scan legs of the tube. In addition, an "optimal" orientation of the scan head will be selected for each leg. The orientation chosen depends on the following optimization heuristics:

(1) The path of the scan head is selected so that no collisions will occur.

(2) No nearly vertical legs are scanned. (What constitutes "nearly vertical" as adjusted by a configuration parameter; tube legs more than 20 degrees from the vertical are scannable).

(3) The path of the scan head is selected so that data will be collected near each end of the leg. (What constitutes "near" is defined by a configuration parameter in terms of a percentage of the length of the leg.)

(4) The rotational position of the scan head is selected to be within a number of degrees (specified by a configuration parameter initially set to 45) of "normal" to the leg (i.e., normal to the projection of the leg onto the work surface).

(5) The path of the scan head is selected so as to maximize the collection of data on the two outer thirds of the leg.

(6) The path of the scan head is selected so as to minimize occlusions.

(7) The rotational position of the scan head is selected to be as close to normal to the leg as possible.

(8) The velocity profile of the scan utilizes equal durations of constant acceleration, equal in magnitude but opposite in sign, at its two ends, and is adjusted so as to insure collection of at least 10 scans on each of the outer thirds of the leg.

The rules are given in order of priority. If the first four rules cannot be satisfied, Path Planning aborts and an error message is given. Rule 4 is invoked first in order to limit the number of positions that must be examined in the search for an optimal path.

Figure 15:
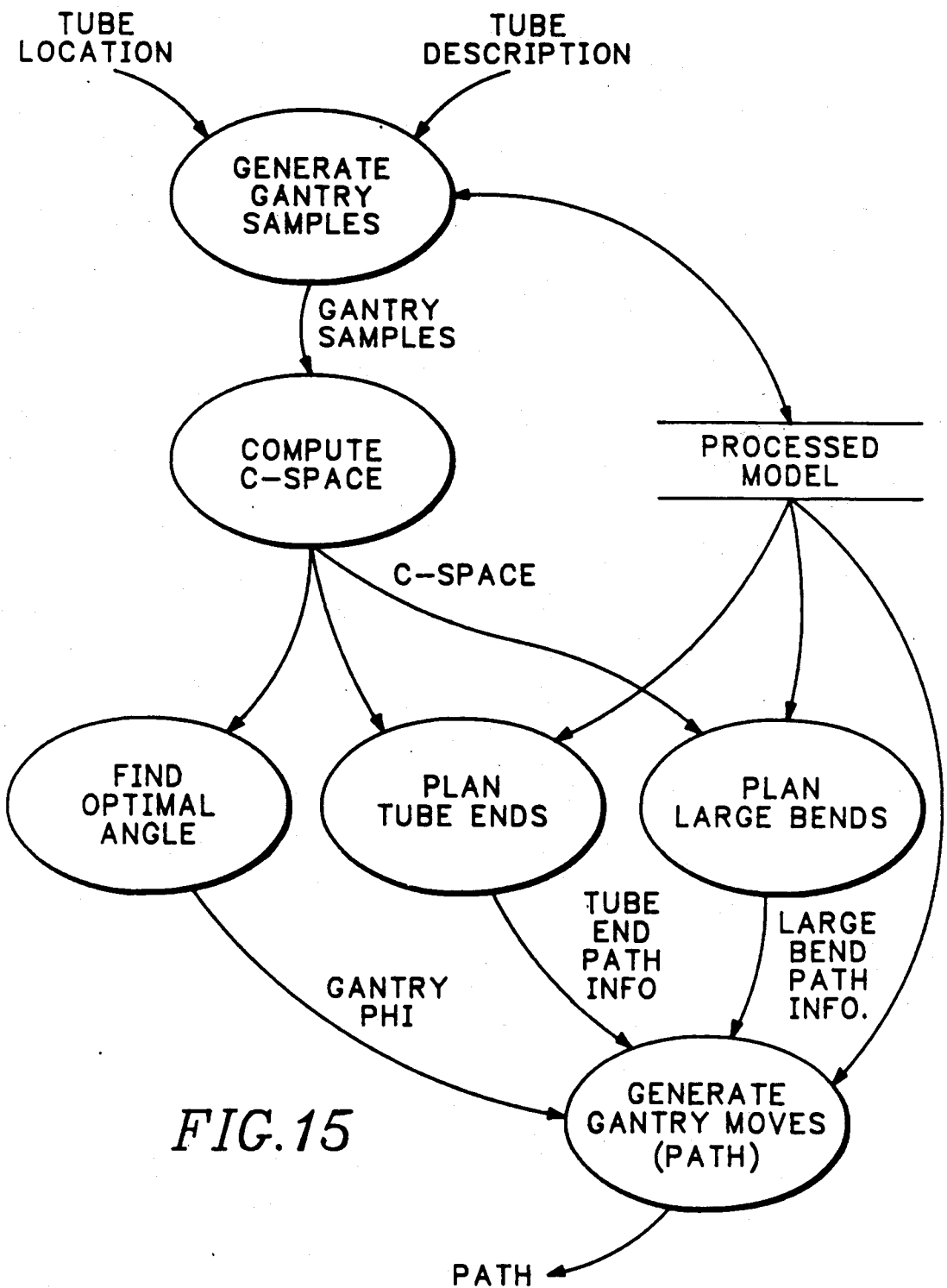
FIG. 15 illustrates the data flow for generating numerical control instructions to control a detailed scan from tube localization and tube model data.
Figure 16:
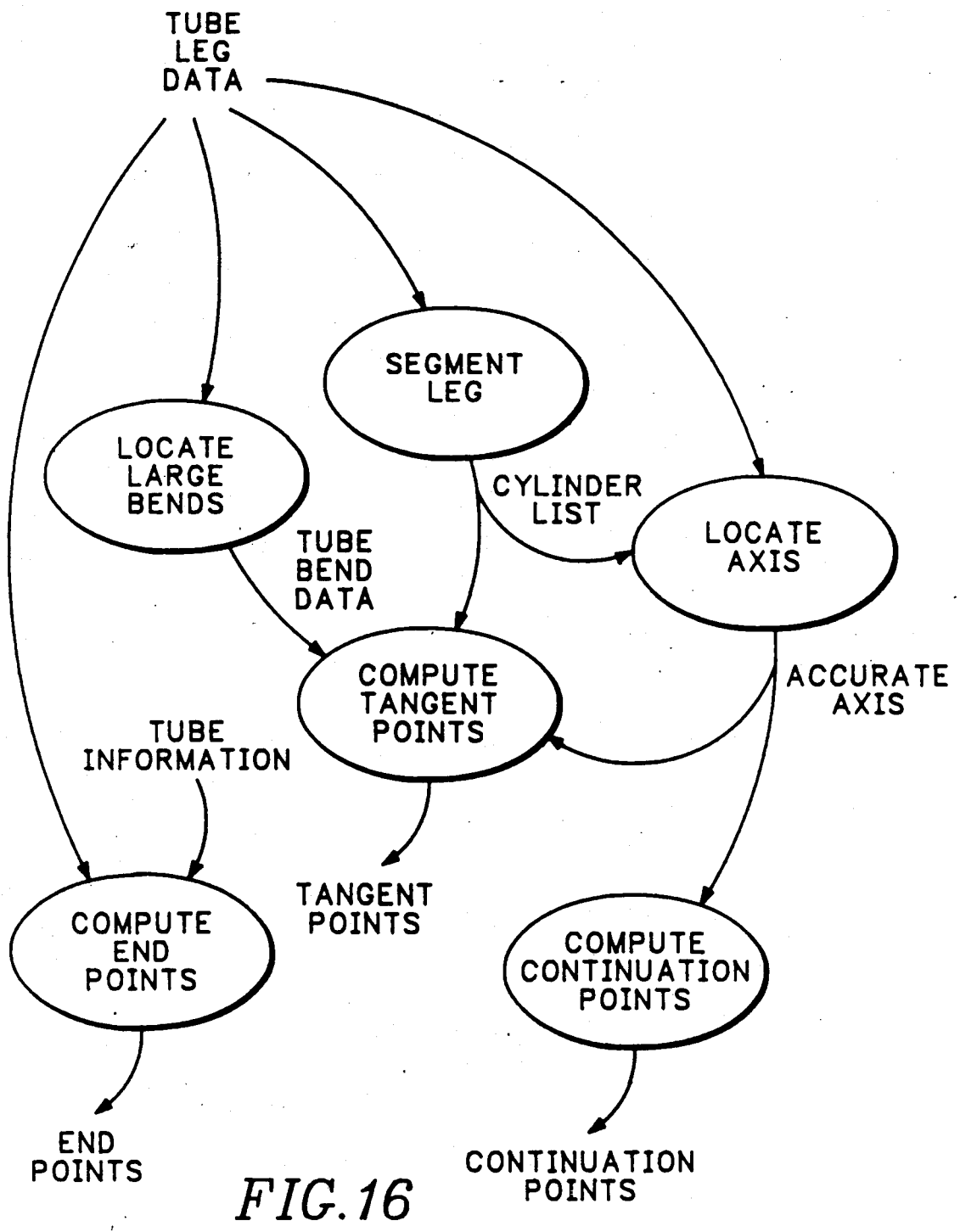
FIG. 16 illustrates the data flow for translating detailed tube shape measurements into the notation of FIG. 10.

Path planning, diagrammed in FIG. 15, proceeds in six steps:

1. First generate gantry samples, which represent positions in the (X,Y,Z) coordinate system of points along the transformed tube model provided by the Localize function. Since the camera axis is vertical and the tube should be centered in the camera field of view, the X-Y translational positions of the scan head are defined by these gantry samples. The Z-translational position depends on the camera standoff; it is also affected by potential collisions.

2. In the second stage, a two-dimensional "configuration space" (or c-space) is filled with flags for optimality and/or occlusion. For each gantry position, optimal and occluded orientations of the scan head are recorded in c-space. Collisions of the scan head and the tube are also recorded in c-space.

3. An optimal path is found through the configuration space. This path describes the optimal orientation of the scan head for each gantry sample. For a scanning hear constrained to rotation about a vertical axis, the optimal angle of scan head orien-tation, ignoring problems of shadowing and camera occlusion, is the one which maximizes the angle between the tube axis and its projection into the plane of illumination along the direction normal to that illumination plane. Under these conditions, the laser source (galvo mirror), camera (optial axis), and tube axis section will all lie in the same vertical (X', Z' or X", Z") plane. If the tube axis were visible in the video image, it would appear to run horizontally (along the X' or X" direction) across the image. An optimal path must avoid any collisions.

4. Paths for scanning the two tube ends are planned.

5. Paths for scanning any large bends are planned.

6. Finally, the optimal path is reduced to a set of robot moves.

Generate_Tube_Samples generates position samples over the entire length of the tube model. For convenience, the tube model is transformed to the global reference frame at the start of Path Planning, and the position samples are generated in the global reference frame for both cylinder and bend sections of the tube. These position samples are subsequently used to test for occlusion of the camera and lasers for all orientations of the scan head.

Gantry samples are stored in the three-dimensional array 'gant_samp'. To avoid problems of dynamic memory allocation, a fixed amount of storage is allotted for gantry samples. The maximum number of cylinders in the tube model will be a constant: 'MAX_N_AXIS'. Since there is one less bend section than straight sections, the maximum number of sections, cylindrical and bend, will be (2 * MAX_N_AXIS −1). For any tube section, an upper bound on the number of samples will be 'MAX_N_SAMPLES'. If the sample spacing is too fine for some section, then the sample spacing will be adjusted (only for that section), so that exactly MAX_N_SAMPLES are generated for that section. The first dimension of gant_samp is the section number. The second dimension is for indexing through the samples of that section. The (X,Y,Z) coordinates of the gantry sample are stored in the third dimension. Note that for the first index, cylinder samples will be stored in sections with even indices (beginning with zero) while bend samples have odd indices.

Generate_Cylinder_Samples

Generation of samples along a cylinder section is straightforward. Given an axis defined by its endpoints, the samples are incremented in the direction of the axis, starting from the first endpoint. Samples are generated until they overrun the second endpoint of the cylinder section. The amount of overrun, or remainder term, is a measure of distance along the axis. The remainder from a cylinder section is converted to arclength to start the next bend section. By saving the remainder term after each section has been generated, and using it to start the next section, the samples should stay uniformly spaced over the entire tube model. Only if the number of samples for some section exceeds MAX_N_SAMPLES, will the sample spacing be adjusted; exactly MAX_N_SAMPLES will then be generated.

Generate_Bend_Samples

The samples along bend sections are generated to test for collision and occlusion of cylinder samples. A remainder term is again used to obtain uniformly spaced samples. The remainder from the previous cylinder section is converted to arclength to start the bend section. After all bend samples have been generated, the remainder term in arclength is converted to linear length, for the next cylinder section. Bend samples are generated in two steps:

1. Generate points on a circular arc in an arbitrary two-dimensional Cartesian coordinate system (x,y) such that the bend lies in the xy plane and the origin lies at the center of curvature of the bend. The arc is centered at the origin, and its radius is the bend_radius. The portion of the circle on which points are generated is between 0 radians and the bend_angle.

2. Transform the points from the xy plane to the global reference frame using 4×4 homogeneous matrix which aligns the arc with the axis of the tube.

Compute_C_Space checks all possible gantry positions (including orientation) for occlusion, optimality and collisions. The translational parameters of the gantry are determined by the global position of the tube (since the camera must center the tube in the field of view). Unless a collision results, the scan head will be a fixed stand-off from the tube. For each translational position of the gantry, the orientations that are optimal or occluded are recorded. Any scan head positions that cause collisions with the tube are also recorded. A two-dimensional array (c-space) which represents the "configuration space", stores the flags for optimality, occlusions and collisions. C-space is stored in row major order, with one row for each gantry sample of a cylinder section; the rotational positions of the scan head are stored in the columns. Each cell in c-space with an optimal orientation is marked by turning on its first bit. If, for some gantry sample, there is an orientation where the camera or both lasers are blocked, then the second bit of the corresponding c-space cell is turned on. A zero cell implies sub-optimal but non-occluded orientation. The third bit is used to mark potential collisions of the scan head and the tube.

Mark_Optimal_Phi

To identify optimal c-space cells, the optimal orientations of the scan head are computed for each axis. The optimal orientations in c-space will be marked for all samples on that axis.

Self_Blockage

To test for occlusion, each axis in the tube model is first checked for self-blockage. Self-blockage occurs if the cylinder axis is vertical (camera blockage) or the axis points toward one of the movable mirrors 64 (laser blockage). Camera self-blockage of an axis will occur for all samples on that axis, regardless of scan head orientation, and hence causes an abort: such tube orientations cannot be scanned. If laser self-blockage occurs for some axis, at some scan head orientation, then all c-space cells along that axis, with that orientation, are marked for occlusion.

Other_Blockage

Occlusion of a sample on some axis can also be caused by a sample from a different section (cylinder or bend). Hence, establishing that there is no occlusion of a given sample at a given orientation requires checking each of the other samples (except those on the current cylinder); this is roughly an order n squared algorithm. For any gantry sample p1, and any orientation, we first compute the effective position of each laser 60 in the global reference frame, i.e., the position of the point of reflection of the laser beam from the galvanometer mirror 64A or 64B. This is a function of p1, scan head orientation, and the laser separation. Next we loop through all gantry samples p2, not on the current cylinder axis. Blockage of p1 from the camera or lasers due to p2 can be checked in the following order:

1. Check that p2 is sufficiently above p1 in the z-coordinate.

2. Check for collisions. If p2 is 45 cm or more (minus a safety margin) below p1 then check to see if the projections of p1 and p2 are closer than the greatest distance from the camera to an edge of the scan head. If they are, mark a potential collision.

3. Check if p2 blocks the camera view of p1.

4. Check for blockage of the left laser by p2.

5. Check for blockage of the right laser by p2.

Laser blockage can be checked using cones, as described in T. Lozano-Perez and W. E. L. Grimson, "Tracking Tubing in Range Data", MIT Artificial Intelligence Laboratory. But considering the number of points, this computation can be relatively expensive. Before the cone is actually computed, a check can be made of p2 in the x-y require p2 to lie p1 in a box in the x-y plane defined by p1 and the laser position. The opposite corners of the box are determined by the x-y coordinates of p1 and the laser position. If p2 passes this test, then we check that p2 lies inside the cone. Otherwise p2 cannot possibly block p1 from the laser.

After c-space has been filled, Find_Optimal_Angles determines an optimal scan head orientation for each translational position of the gantry. The choice of angle depends on the heuristics mentioned above. There are two possible strategies, input through the flag 'op_code'. The first is the "best-return" strategy, which returns the clear path in which the scan head is closest to being perpendicular to the axis. The second is the "nearest-return" strategy, which returns a clear path that starts as close as possible to the ending position and orientation of the previous path.

For straight sections, if all orientations are blocked, then a path with no blockages at the ends (and no collisions) will be sought, and among those the one with the fewest occlusions will be selected. On the other hand, for paths over large bends a path is sought with no blockages in the middle of the bend.

Any planning decisions, such as trading-off occlusion over the center of a cylinder for better orientation, are made at this point. It should be noted though, for straight sections with significant sag, scans are needed over the center of the cylinder.

Finally, Create_Path_Plan reduces the path derived in Find_Optimal_Angles to a minimal set of gantry moves for the robot controller. For instance, a constant orientation is picked for each leg (rather than an orientation for each sample in the leg). In addition, a sub-path is chosen from the end of each leg (except the last) to the start of the next leg; this sub-path must avoid any collisions.

After the tube axes for the first and last cylinders have been determined, the locations of the tube ends are determined by establishing where tube surface data extends farthest along the direction of the tube axis. Plan_Tube_Ends enables special scans to be planned for approaching and leaving the ends of the first and last cylinders (respectively) in order to determine the locations of the tube ends. These special scans are indexed one or two steps from the optimal scanning angle for determining the tube axis. The tube ends are found by the routine Find_Tube_Ends in Analysis. Inputs to define these special scans are the approach angle and the length of the path. The input 'approach_angle' is the angle between the cylinder axis and the straight line of the path. The approach angle is defined in a plane containing the corresponding cylinder axis. The other input 'path_end_len' is the length of the path. The halfway point of the path should pass over the tube end. The start point S and the end point E of the path can be described by the following sequence of transformations:

1. Initialize the start and end to two symmetrically placed points on the x-axis:

S=(half, 0, 0 )

and E=(— half, 0, 0 )

where half=path_end_len/2. Note start and end could be reversed depending on whether the scan head is approaching or leaving the tube end.

2. Rotate S and E in the x-y plane by the approach_angle.

3. Now rotate S and E so that the positive x-axis aligns with the cylinder direction vector; there is no rotation about the cylinder axis.

4. Translate S and E by the position of the tube end.

5. Translate S and E up by the z-standoff.

The scan head would then move from points S and E, with an orientation that is perpendicular to the path travel (in the x-y plane).

The selectd path is now reduced to a set of robot moves which are output to be used in carrying out the detailed inspection.

Path Planning is described in the following pseudo-code:

Build Path Plan
Linearly transform model data according to best-fit
    orientation
For each straight section in model
    Set first path point an extended distance
        along model axis before first end of
        straight section
    Set last path point an extended distance along
        model axis beyond second end of straight
        section
    In lookup table, determine best rotational
        axis position for sensing tube
    If sensing is not possible
        Report "cannot scan"
        Exit.
    For each end of the section
        If the scanner head interferes with the
            other section end when scanning
            current end,
            Report "cannot scan"
            Exit.
    End for
    Calculate head offset above tube for centering
        first end of section within sensor range
    Calculate head offset above tube for centering
        second end of section within sensor range
    Generate machine moves to:
        Position above first end
    Rotate sensor to proper orientation
    Move slowly along straight path to
        measure first end
    If section is long
        Move rapidly along straight path to
            measure center
    Move slowly along straight path to
        measure second end
    End for
Encode moves in machine-specific format as Machine
    Coded Data set
End.

ANALYSIS

Analysis may be replicated on several processors, and the data for a complete leg is assigned to one processor as the processor becomes available for a new task. The Analysis functions operate in parallel with the real-time functions and in some cases in parallel with each other.

Each processor
    segments the data, discarding seams from bend sections, and where required for sag compensation, breaks it into smaller segments;
    locates the axis of the leg;
    locates the end points of the tube;
    locates the extreme points of the tube;
    locates the extreme point of the bend; and
    locates continuation points.

The resulting data is passed to the Executive where tangent points are calculated. The order in which tasks are performed is diagrammed in FIGS. 22 and 23.

The scan data is acquired by the real-time functions which filter it and transform it to global coordinates and, using the path plan developed by the preliminary inspection as a basis, organize it into "legs" which are stored as records of "tube data". The analysis functions first process these "legs" through the steps described below:

Axis Direction associates direction vectors with each scan in the leg;

Discard Bends sets pointers to identify which scans in a leg derive from the straight section; and Segment Legs breaks legs into segments, as necessary, to insure that no segment is longer than the maximum permitted by the requirements of sag compensation.

Prior to carrying out the detailed calculations which determine with precision the location (and hence the direction) of a leg axis, the routine Axis__Direction, which is described below, is used to give an estimate, good to within two or three degrees, of the direction of that axis. This estimate is used to discard scans from bends and as the starting point for the more precise calculations in Locate__Axis.

The basis for the routine Axis__Direction is the Cylinder Axis Direction Finding Algorithm described in T. Lozano-Perez, W. E. L. Grimson and S. J. White, Finding Cylinders in Range Data, Procs. 1987 IEEE Conf. on Robotics and Automation. This algorithm utilizes a reasonably simple geometric fact about cylinders as the basis for producing its estimate: for scans that are "close" to being parallel to each other, any two line segments that join points from one scan to points on the other and are parallel to each other are in fact parallel to the tube axis. That is, if a and b are points on one scan and a' and b' are points on another, and if the line segments aa' and bb' are parallel, then the direction of aa' or bb' is the direction of the tube axis. The precise requirement is that rotating one scan to become parallel to the other does not require passing through an intermediate position parallel to the axis of the tube; in the ATIS the scan head 44 does not rotate during a pass along a leg so the scans will be parallel and hence this potential problem does not arise.

The Axis__Direction routine produces, for each scan, a direction vector relating that scan and the next. When both scans lie along the same leg, these direction vectors approximate the axis of the leg and hence are approximately equal. In the case of scans from a bend section, or of one scan from a leg and one from a bend, the direction does not approximate the axis of the adjacent leg. This fact is used to distinguish the scans of a leg from the scans of a bend section at an end of the leg.

The dot product v * v' of two vectors is the product of their length times the cosine of the angle between them; thus two directions (vectors from the origin of unit length, i.e., points on the unit sphere) are parallel if and only if their dot product is 1. Hence, the direction of the tube axis can be found by finding points a, a', b, and b' as above such that the dot product of the directions of aa' and bb' is close to 1. Given the discrete nature of the scan data, plus the error components, such points will not always exist; in practice one looks for a maximum value for this dot product.

Given a pointer to a leg in tube__data each of whose scans are assumed to have the same non-zero orientation, this task computes a direction vector for each scan and stores it with the scan's entry in tube__data. (Except that no direction is assigned to the first scan.)

The direction vector for a scan is determined using a nearby preceding scan. This use of closely spaced scans allows Discard__Bends to identify fabricated bends while remaining blind to the gentle bends caused by sag. (The sensitivity of this determination is controlled by a configuration parameter and can thus be adjusted without modifying the source code.

Calculation of direction starts in the center of the leg, where data is presumably good, and works outward toward the two ends. The direction is determined by means of a search which will terminate more quickly if a good initial estimate of the direction is used. For the first scan processed, the direction determined in the preliminary inspection is the best estimate of the direction available and is used as the initial estimate. For subsequent scans, the direction produced by processing the adjacent scan is the best available estimate and it is used as the initial estimate.

Select__a,a'

Two widely spaced points are selected from the first scan, distinct from any previously selected points in this scan. The points are also chosen to be in the "overlap" of the two scans, so that they can be illuminated by either (or both) of the laser sources.

Select__s,s'

Two points from the second scan are selected o with approximately the same spacing as a,a' (in pixels). The estimated direction (from the adjacent scan or, for the first scan to be processed in a leg, the data acquired in the preliminary inspection) is used to select s. The points are taken from the "overlap" of the two scans and are in the same order, along the scan, as a and a'.

Compute__Dots

Compute the dot product of ab and a'b; for b and b' drawn from a range of points around s and s', e.g. from s−SEARCH__RANGE to s+SEARCH__RANGE and from s'−SEARCH__RANGE to s'+SEARCH__RANGE. The results are stored in a local vector dot__products whose first entry gives its length.

Find__Direction

Analyzes the values in dot__products to determine if a global maximum has been detected. If not, maximum__error is set to 1. If a maximum has been found, the dot products are used to interpolate the subpixel location of the point b for which ab is parallel to the cylinder axis. The normalized direction of ab is stored in a local vector directions whose first entry gives its length.

Average__Directions

The most recently calculated direction is averaged with the preceding directions. If, after MINIMUM__NUMBER__OF__DIRECTIONS, the change is less than DIRECTION__EPSILON, the result is written in tube__scans and the Axis__Direction routine terminates. If more than TOO__MANY__DIRECTIONS have been calculated, direction__error is set to 1.

Discard__Bends

The legs. of tube data provided by the real-time functions consist of all scans from some straight section of the tube together with a few scans from any adjacent bend sections. (The sorting of scans into legs is based upon the determination in the preliminary inspection of the location of the straight sections of the tube.) Discard__Bends determines which of these scans derive from straight sections.

This is accomplished by the use of a split and merge routine which identifies scans at which the axis vector undergoes a large and persisting change of direction; such scans being assumed to derive from bends. If the directions are not all sufficiently close to each other, the set of directions is split into two new sets, approximately the first half of the scans and the second half. This process is repeated on the new sets until eventually all of the sets contain only directions which are nearly identical. This is the "split" portion of the split and merge routine.

Because of the cavalier manner in which sets were split it is quite likely that distinct sets ended up containing nearly identical directions. The merge routine corrects this by joining any two adjacent sets of scans whose members are sufficiently close to each other, and this process is iterated until no new merges take place. The end result is:

a set of directions representing scans from the leg; and one or more sets representing scans from adjacent bends.

Pointers (initially zero) to the first and last good scan in the leg are stored in the leg record.

Detection of the set corresponding to the leg should usually be quite simple, because it will be by far the largest set. However, as a check the information from Path Planning as to the approximate direction of the leg, and the assurance that the scans from the middle of the path lie on the leg, also are used. If there is a significant disparity (2.5 cm in length or 2 degrees in azimuth or elevation), an error condition is flagged.

Split_Directions

The data that we are fitting consists of tube section axis direction vectors given as pairs of angles (r(i), a(i)), where i ranges from 1 to N, representing the "rotation" and "angle" of the direction vectors. For a given leg, these angles are nearly constant except at the ends, so it is reasonable to restrict the approximating lines to lines constant in r and a. Also, since deviation in either angle is equally important, the same threshold is used for each.

With these simplifications, the line that is fit to the data is just the line $1(i) = \bar{r} + \bar{a}$ which passes through the averages of the r(i) and a(i), $\bar{r}$ and $\bar{a}$ respectively. The maximum error is just the maximum difference, in magnitude, between any r(i) and $\bar{r}$ or between any a(i) and $\bar{a}$.

If the maximum error exceeds the threshold, then the data is split into two subsets, (r(i), a(i)), where i ranges from 1 to M and (r(i), a(i)), where i ranges from M to N, for M the greatest integer in N/2. The process described above is then iterated for these two sets. If the maximum error is not exceeded, this collection of scans is reported as a segment to Merge_Directions.

Merge_Directions

Adjacent segments are compared; if their direction angles (the averages of the angles of the scans that make up the segments) differ by less than a predetermined threshold, then the two segments are merged. This process is repeated until no new mergers take place.

Set_Leg_Points

This routine sets pointers in tube data to indicate the ends of the segments produced by Merge_Directions.

Segment_Legs

Segment_Legs divides each leg into segments, as necessary, to insure that no single segment exceeds the maximum length passed by the workstation controller in the Model Description header. (The "top" point in a scan is the point having the highest Z coordinate; if more than one point has that Z coordinate, the top point is created by averaging their X and Y values. For purposes of segmentation, the length of a segment is measured as the distance between "top" points.

Each segment is a sequence of adjacent scans and adjacent segments share exactly one scan. The segments are described through the creation of a file that gives the number of segments (one to 256) and for each segment an axis direction (initially null) and pointers to each segment's first scan.

The position and direction of the axis of each segment in a leg are located by means of an iterated regression. The data that is fitted by the iterated regression is itself produced by a collection of different (circular) regressions.

Locate_Axis

This procedure uses an iterative technique to estimate the orientation and position of a segment's axis from scan data. Each iteration starts with an estimate of the direction of the segment's axis and produces an improved estimate. For the first iteration, the direction determined in the preliminary inspection is used as the estimated direction; subsequent iterations use the estimate developed by the preceding iteration.

The scans, since they are profiles of a cylinder, are ellipses. The general plan is to find the centers of these ellipses and hence the axis of the cylinder. However, it has been determined both experimentally and on the basis of theoretical considerations that directly fitting the kind of sparse elliptical data available in this system is prone to considerable error. Consequently, an indirect approach is used; this approach is based upon the fact that the projections of profiles of a cylinder onto the base of the cylinder will be circles.

The estimated direction of the axis is used to produce estimates of these projections. A radial regression is then used to determine the "centers" of the estimated projections and X values for these centers are calculated to provide a swarm of "centers" for the original scans. A line is then fit to these "centers" to provide a new estimate for the direction of the axis. When the dot product of successive direction estimates converges within some tolerance, the axis is deemed located.

The line that "best" fits a collection of points in three dimensional space, in the sense of minimizing the sum of the squares of the distances from the points to the line, is the principal eigenvector of a matrix, called the "scatter matrix", which is associated with the points. In this routine such an eigenvector is calculated at each iteration to estimate the cylinder's axis.

Algorithm Summary

The algorithm can be summarized as follows:

1. Enter with an initial value for the cylinder direction. (This initial value will typically be the eigenvector produced by a previous iteration of the procedure, and is hence called an "eigenvector" in the following steps; but the routine can be entered with any direction. A poor direction only causes the routine to take longer to converge.)

2. Use the rotation transformation that aligns the eigenvector with the positive x-axis of an arbitrary reference frame to rotate the entire data set.

3. Estimate points on the cylinder axis by computing circle centers for each scan.

4. Fit an eigenvector through the points computed in step 3.

5. Check convergence by computing the dot product between the latest eigenvector and the positive x-axis. (The previous eigenvector.)

6. Repeat steps 2 through 5 until successive eigenvectors converge in step 5.

7. Rotate the final eigenvector and position vector back to the original reference frame.

Figure 18:
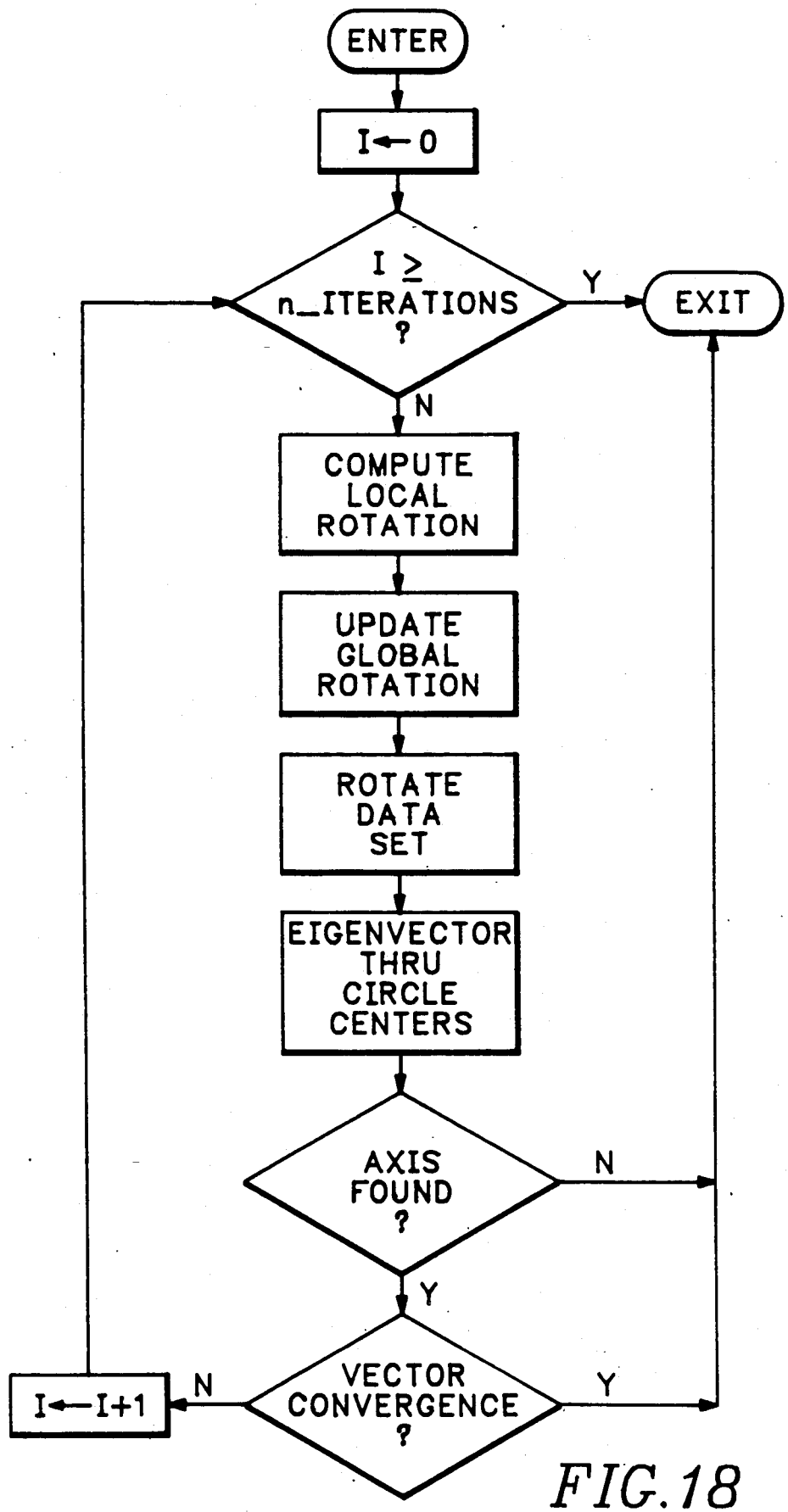
FIG. 18 illustrates a procedure used to fit points to an axis.
Figure 21:
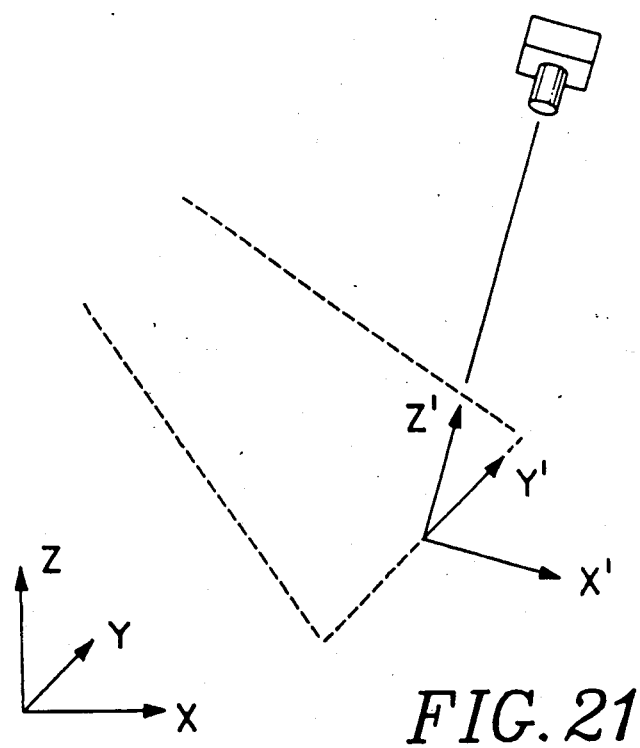
FIG. 21 illustrates the relationship between the system reference frame and the local reference frame of an individual sparse or detailed scan sensor.

This algorithm design is displayed in terms of control flow in FIG. 18. The scan data and the estimate of the axis direction given by the preliminary inspection are input, and the final direction vector is returned.

We now examine the data structures used in execution of the algorithm. Each coordinate is stored in separate buffers of type real. There are two areas for scan data: the first public area is for the original scan data in global coordinates (x_dat, y_dat, z_dat); the other is a private area for scan data in local coordinates (x_dat_loc, y_dat_loc, z_dat_loc).

Two rotation matrices are maintained. The first (rot_global) is the global rotation from the global coordinate system to the latest eigenvector reference frame. The second (rot_local) is the local rotation between successive eigenvector iterations. Whenever a new local rotation has been computed, the global rotation is updated and the original data (x_dat, y_dat, z_dat) is rotated to the new reference frame (x_dat_loc, y_dat_loc, z_dat_loc).

There are never any translations of the data; only rotations, projections and "inverses of projections" are necessary. The projections (onto the Y-Z plane) are obtained by ignoring the X coordinate in the scan data. Once a new circle center is calculated, in the Y-Z plane, its inverse under the projection is calculated by intersecting the line through it and parallel to the axis of projection (in this case, the X axis) with the laser plane. The plane is stored in point-normal form and is transformed to the local coordinate system.

Eigenvector_thru_Circle_Centers

This routine computes a circle center for all scans (in the latest eigenvector reference frame) and fits an eigenvector through these circle centers. The inputs include the original data in global coordinates (x_dat, y_dat, z_dat), the latest global rotation matrix (R_global), the laser Plane equation for each scan (global coordinates) and a guess for the eigenvector.

The new eigenvector in local coordinates and the average vector are output. Also, in order to improve the robustness of Locate_Axis, "outliers" are deleted from the data set after the first eigenvector has been computed. This process filters out noise as well as errors in segmenting bends.

step 1. Do steps 2 through 4 for each scan.
step 2. Compute a y-z center in local coordinates.
step 3. Compute the x-position of the circle center (in local coordinates) from the laser plane equation and the global rotation matrix. (This routine is called Solve_For_Offset.)
step 4. Save the y-z center from step 2 and the x-position from step 3. Note these centers are in local coordinates.
step 5. Fit an eigenvector through the points collected in step 4. The eigenvector returned is in local coordinates.
step 6. If this is the first pass, calculate the distances from the centers of each data set to the eigenvector and delete those whose centers are more than three sigma away.

The pseudocode for Eigenvector_thru_Circle_Centers follows:

---

Calculate Axis Point
Project data for one scan into a plane normal to estimated axis.
Fit circle to data
Calculate circle center in projected plane
Project circle center back along projection axis into the plane of the illumination line
Record circle center location
End.

---

Calculate Axis Location
For each section
   Initialize axis direction as current model axis direction
   Loop
      For each scan line of cylinder
         Calculate axis point
      Calculate mean location of all reported circle centers
      Calculate scatter matrix of all circles about mean
      Calculate dominant eigenvalue of scatter matrix
      Set new axis direction estimate as eigenenvector
      Exit loop if change in direction estimate is small
   End loop
   Axis for leg is through latest mean point in latest axis direction
End for
End.

---

Solve_for_X_Offset.

Once the y and z coordinates of the new circle's center have been determined, the x-coordinate can be found geometrically. The center of each circular regression must lie in the beam plane. This plane is determined, for each scan and relative to the other scans, by the laser angle (the orientation of the beam plane in the global reference frame) and an offset for the scan. For use here it is rotated from the global reference frame to the current reference frame.

In this rotated coordinate system, the x-component of the circle center can be computed from the equation for the planar equation and the y-z components of the center. More formally, we are given p = point on beam plane in global frame,
q = normal to beam plane in global frame,
$y_c$ = y-component of circle center in new frame,
$z_c$ = z-component of circle center in new frame and we solve for $x_c$ = x-component of circle center in new frame.

The beam plane is defined in the global coordinate system by a point $p=(p_x, p_y, p_z)$ and a normal vector $q=(q_x, q_y, q_z)$. Rotate p to the point $u=(u_x, u_y, u_z)$ in the local eigenvector reference frame; likewise q is rotated to $v=(v_x, v_y, v_z)$. The planar equation in the rotated reference frame is then $$a*x + b*y + c*z = d$$

where $a = v_x, \ b = v_y, \ c = v_z$ and $$d = u_x * v_x + u_y * v_y + u_z * v_z.$$

Then the x-component in the new reference frame is $$x_c = (d - b * y_c - c * z_c)/a.$$

Reject_Outlying_Scans

We now examine in more detail the outlier deletion for the eigenvector regression. After the first eigenvector has been fit to the circle centers, the residuals in the least-squares-perpendicular sense are computed. The residuals are the minimum distance in three-dimensional space from a point to a line. Data sets whose centers lie more than three standard deviations from the eigenvector are deleted.

Check_Convergence

This Boolean function computes the dot product of the latest eigenvector and the previous eigenvector and compares it to a specified tolerance (close to 1.0). If the dot product is within tolerance, then the eigenvectors have converged.

Compute_Rotation_Matrix

Given a normalized eigenvector $$v = [x,y,z]^t,$$

in the (i,j,k) coordinate system, we compute the rotation matrix to rotate v to positive x-axis. Assume $v <> k$ where $$k = [0,0,1]^t.$$

Let R be defined in terms of column vectors as follows.

$$R = [r_x | r_y | r_z]$$

$$= \begin{vmatrix} r_{xx} & r_{xy} & r_{xz} \\ r_{yx} & r_{yy} & r_{yz} \\ r_{zx} & r_{zy} & r_{zz} \end{vmatrix}.$$

First choose $$r_x = v \text{ (} v \text{ must be normalized)}.$$

Next pick $$r_y = -(r_x \times k) = [-y, x, 0]^t;$$

then normalize $r_y$. Finally let $$r_z = r_x \times r_y;$$

and normalize $r_z$. Then $$[r_x, r_y, r_z]$$

forms an orthonormal basis in the new reference frame. The matrix R has been derived to rotate the original basis (i, j, k) to the new coordinate system where the vector v becomes the positive x-axis. The transpose of R is used for inverse rotation.

Update_Global_Rotation

The current global rotation matrix (rot_global) is updated with the latest local rotation matrix (rot_local). This is a simple 3×3 matrix multiply.

Rotate_Data_Set

The original data set (x_dat_inp, y_dat_inp, z_dat_inp) is rotated by the current global rotation matrix (rot_global) to a new data set (x_dat, y_dat, z_dat) in the latest eigenvector coordinate system.

End_Points

The tubes are hollow and hence the tube ends present little surface from which measurements can be obtained; furthermore, tube ends may be chamfered and hence almost certain to produce unreliable data. Consequently, the measurements of the positions of the tube ends are less reliable than other measurements and the data used can be expected to contain many more spurious points.

The tube ends are found after all scanning is complete. Therefore, the tube axis at each end is known. Also, the tube diameter is known. The basic approach involves four steps:

Valid data points must lie at a distance approximately equal to the tube radius from the axis vector; discard all data points that do not;

Project each of the valid data points onto the axis vector (calculated as a dot product);

Valid projected points will not be isolated; discard any which are; and

Where the axis vector is taken to point away from the midpoint of the tube axis, select the valid projected point furthest along the vector.

The cylinder axis can be described by a parameterized line:

$$L(t) = p + t * d.$$

where p is the position and d is the unit directional vector. The parameter t represents the 'signed distance' along the axis from p. Note that Locate_Axis will always choose p near the middle of a straight section, away from the tube end. Hence, the tube end occurs at the non-spurious point that maximizes abs (t).

The plan is to maximize abs (t) over all nons-purious points in each scan; an average tube end is then computed over all scans. A non-spurious point is identified by computing the minimum distance from the point to the axis and comparing this distance to the tube radius. If the minimum distance is close to the tube radius, then the point is used to find the tube end; otherwise it is ignored.

To find the tube end for a single scan, it is not necessary to loop through the entire scan. By orienting the camera so that the line number 0 (the lowest horizonal scan line of the camera) is beyond the end of the tube, the loop can be started at line 0 and continued until abs (t) starts decreasing. The tube end is approximated at the line number where abs (t) is maximized.

Given a line $L(t) = p + t * d$ and a point q, the minimum distance from q to L(t) occurs at $t_q$ where $$t_q = (q - p) * d.$$

This is the projection of the vector (q−p) on the unit vector d. The minimum distance from the point q to the line L(t) is then the length of the vector $(q-L(t_q))$.

The algorithm to find the tube ends can be summarized as follows:

step 1. Approximate the tube end for each scan. The routine Find_Tube_End_One_Scan will return the tube end of one scan in terms of the parameter $t_{max}$.

step 2. Let $t_{avg}$=average of $t_{max}$ over all scans in step 1.

step 3. End of tube is at the point $$L(t_{avg}) = p + t_{avg} * d.$$

Find_Tube_End_One_Scan comprises the following steps:

step 1. ii :=0; (* Start search at line number 0. *)
step 2. $t_{max}$:=0; (* Initialize running max. *)
step 3. Compute $t_{val}$ for the point q (at line number ii of the scan) where q is a minimum distance to L(t); the value for is also acquired.
step 4. if abs (min_dist - radius)<epsilon then if abs $(t_{val})$>abs $(t_{max})$ then $t_{max}$:=$t_{val}$.
step 5. ii :=ii+1;
step 6. Repeat steps 3 through 5 until $t_{val}$ starts decreasing.

Continuation_Points

In order to provide data for sag compensation, segments are created which are not separated by a bend. This routine determines the location points at which the axes of such segments meet, continuation points, as the midpoint of the line connecting the endpoints of the axes of two adjacent segments. Since adjacent segments are created so as to share a scan in common, both endpoints will lie in the same scan plane so the location of the continuation point is confined to that plane.

When the detailed inspection has been completed, the Executive provides the detailed description of the production tube to the workstation controller. The workstation controller adjusts the detailed description to remove the continuation points. This is accomplished by bringing the continuation points and tangent points of a sagging leg into collinear relationship. For example, starting at one end of the leg, the line on which the tangent point and the first continuation point lie is defined, and the rotational transformation about the first continuation point required to bring the second continuation point onto that line is calculated. This transformation is applied to all continuation, tangent and end points that lie on the same side of the first continuation point as the second continuation point. This operation is repeated until the second tangent point of the leg has been transformed so that it lies on the same line as the first tangent point and the first continuation point.

The adjusted detailed description is compared with the model description to determine whether the configuration of the production tube conforms sufficiently closely to that of the prototype tube. Comparison is effected through use of four routines:

1. Standard Alignment, which transforms a tube description in tangent point format in an arbitrary frame of reference to a corresponding description in a coordinate system such that a selected end of the tube is at the origin, the first two legs lie in the xy plane, the first leg being along the y axis in the positive direction, and the first bend oriented such that the second leg extends into the first quadrant of the xy plane.

2. Optimal Alignment, which iteratively applies tiny rotation and translation transformations to the tube description to produce an aligned tube description in tangent point format with minimal displacements between corresponding features of the aligned and reference tube descriptions.

3. Tube Differences, which calculates the differences between the positions of tangent points in the adjusted detailed description and the corresponding points of the model description, the distance between each hard point on a leg of the model tube and the closest point on the corresponding leg of the production tube, and, for each continuation point in a detailed description, its distance from the axis of the corresponding leg of the model tube. (A hard point is a point along the length of the tube at which compliance with manufacturing tolerances is especially important. It may, for example, be a point at which the tube, when installed, passes through a bulkhead or a clamping block.) Tube Differences may also be used to calculate, for a detailed description that has not undergone sag compensation, the difference between each continuation point and the corresponding leg of the model tube, in order to identify material defects and problems with the bending process.

4. End Offsets, which calculates the amount by which an endpoint in the detailed description differs from the corresponding end point of the model description.

5. Envelope Criterion, which utilizes the differences provided by the Tube Differences routine and compares the differences with tolerances established for those differences and returns an indication of whether the tolerances have been exceeded.

If the match between the detailed description and the model description is not sufficently close, the bend program stored in the host computer is adjusted in a manner such as to reduce the mismatch. This is accomplished in the workstation controller in two steps:

1. Calculate Bend Corrections, which first transforms the reference tube description into LRA notation, second transforms the scanned tube description into LRA notation, and third compares the two LRA representations term by term to determine corrections required to make the scanned LRA representation match the reference LRA representation.

2. Applying Bend Corrections, which receives the bend program and the corrections provided by Bend Correction Calculations and provides a corrected bend program.

The workstation controller is also able to generate a bend program from a model description using the following routines:

1. Bend Compensation, which receives the description, in LRA form, of a sample tube that has been bent in a standard 20°/120° test, and the length of the sample tube prior to bending, and computes springback and elongation coefficients.

2. Apply Bend Compensation, which receives the springback coefficients and a model description in LRA form and applies the springback coefficients to modify the angle of the model description and provide the corresponding angle of the bend program.

The workstation controller provides the process sequencing necessary to make the system operations automatic. The workstation controller performs the following functions:

1. Obtain process initiation commands from the system operator at the system terminal 14, 2. Request from the database reference tube descriptions for path planning in the scanner controller and tube configuration analysis in the workstation controller, 3. Request from the database bend program descriptions which can be used by the bending equipment to manufacture the workpiece.

4. Locally manage the data sets representing reference tube shapes, scanned tube shapes, sag-corrected scanned tube shapes, bend program descriptions, and various other intermediate notation, such as LRA notations, used for special operations, 5. Display for the operator any data set available to the workstation controller, the status of processes underway in other subsystems for database access and scan control and the results of analysis operations, 6. Control communication devices which provide the physical medium for the exchange of messages with subsystems, 7. Perform analysis operations of sag compensation, optimal alignment, and tolerance checking, 8. Perform analysis operations of determining physical properties of workpiece materials from bent samples, 9. Accept approximate configuration data from the operator to guide the scanning of tubes which do not have a reference description in the system's database, 10. Compare desired workpiece configuration to an aligned scanned configuration, 11. Determine whether the differences resulting from comparison operations are within acceptable tolerances, 12. Calculate corrections which should be applied to the bend instructions to make the bending machinery produce tubes more nearly in conformance to the desired configuration, 13. Approximately sequence the other twelve operations to scan the workpiece, evaluate its shape, determine whether the configuration scanned conforms to acceptable tolerances, modify the bend program to correct for observed variations, and transfer via computer 2 the revised bend program to benders 6, all without further operator intervention.

It will be appreciated that the present invention is not restricted to the particular embodiment that has been described, and that variations may be made therein without departing from the scope of the invention as defined in the appended claims and equivalents thereof. For example, it is not essential to the invention to carry out a preliminary scan before carrying out the detailed scan. In a single scan method, the scan head is moved across the table until the tube is detected, and the scan head is moved in the vertical direction to position it so that the tube is at the center of the range within which the scan head can sense the tube. The scan head is then moved a short distance in the X direction and the direction of the tube axis is estimated by the method described in the above-mentioned paper, Finding Cylinders in Range Data. The estimated direction of the tube axis is applied to an adaptive discrete filter, which also receives the model description. The position of the axis of the tube is calculated and recorded. The scan head is transported in the estimated axis direction by a short distance and the tube is scanned and a new axis point is calculated and recorded. The latest axis point and the previous axis point are used to determine an offset direction, and this offset direction is applied to the discrete filter to generate an updated axis direction. If the updated axis direction is not significantly different from the previous axis direction, the operation of transporting the sensor, scanning the tube etc. are repeated and the axis direction is updated again. If the updated axis direction is significantly different from the previous axis direction, it is assumed that the sensor has reached the end of a leg of the tube, and scan head is rotated to a new angular position. The new angular position is obtained from a look-up table that relates axis direction to angular position of the scan head. When the scan head reaches an end of the tube, it is returned to the position at which it first detected the tube, and the same sequence of operations is carried out except that the tube is traversed in the opposite direction. In this method, since a path is not planned in advance, there is a possibility of a collision between the scan head and the tube. If a collision occurs, the inspection is aborted. A new inspection may be attempted with the tube in a different position on the table, or it may be concluded that the tube cannot be scanned without a collision, in which case another technique has to be employed for inspection. The following pseudocode describes the method:

```
Scan Sequence
Move transport to starting location
Scan once across the table
If no point on tube is observed
    Exit.
Move transport so that observed point is in center of
    sensor range
Sense tube
Displace sensor a short distance
Sense tube
Apply dot-product optimization to estimate axis
    direction
Initialize discrete filter with initial direction
Determine the initial rotational axis orientation from a
    lookup table
Rotate axis and position so that tube section is in
    sensor view
CALCULATE AXIS POINT
Record axis point
Loop
    Transport the sensor in the estimated axis
        direction
    Sense tube
    If tube is not in sensor view,
        break loop
    CALCULATE AXIS POINT
    Record axis point
    Determine offset direction from difference between
        last two axis points
    Apply discrete filter to update axis direction
    If axis direction has changed sufficiently
        Calculate rotation of sensor head from lookup
            table
        Rotate axis to new orientation
    End loop
Reorient sensor to initial rotation
Move to initial location
Repeat the preceding loop, but traverse the tube in
    the opposite direction
End.
```

Also, it is not essential that the detailed scan position sensor employ two laser beams to illuminate the tube. Two beams are required in order to illuminate a sufficient arc of the tube to enable the algorithms to return accurate values of the center of the tube, but by use of a different algorithm a single beam would be sufficient.

We claim:

1. A method for determining whether an elongate workpiece at an arbitrary location in a frame of reference conforms to a desired configuration, comprising:

carrying out a first inspection of the workpiece and generating first information representative of the actual configuration of the workpiece, comparing the first information with information representative of the desired configuration, using the result of the comparison to estimate the location and orientation of the workpiece in the frame of reference and determine an optimum path for scanning the workpiece, using a position sensor to carry out a second data collection, by transporting the position sensor along the optimum path, and generate second information representative of the actual configuration of the workpiece, and comparing the second information with the information representative of the desired configuration.

2. A method for determining whether an elongate workpiece, which is nominally of a desired configuration, conforms to the desired configuration within a predetermined tolerance, comprising:

carrying out a first data collection and generating first information representative of the locations of elements of the workpiece in a frame of reference, comparing the first information with information representative of the desired configuration, using the result of the comparison to estimate the location and orientation of the workpiece in the frame of reference and determine an optimum path for scanning the workpiece, using a position sensor to carry out a second data collection, by transporting the position sensor along the optimum path, and generate second information representative of the locations of elements of the workpiece in the frame of reference, and comparing the second information with the information representative of the desired configuration.

3. A method according to claim 2, wherein the optimum path is defined such that the position sensor remains at a substantially constant distance from the workpiece.

4. A method according to claim 2, wherein the position sensor is movable along three mutually perpendicular axes that define the frame of reference, and the optimum path is defined such that the position sensor remains at a substantially constant distance along one of said axes from the workpiece.

* * * * *

UNITED STATES PATENT AND TRADEMARK OFFICE
CERTIFICATE OF CORRECTION

PATENT NO. : 5,046,852

DATED : September 10, 1991

INVENTOR(S) : Albert L. Hametner; Larry L. Tammell

It is certified that error appears in the above-identified patent and that said Letters Patent is hereby corrected as shown below:

Column 10, line 13, "seventy two" should read --seventy-two--.

Column 11, line 49, "In order to carry out" should start a new paragraph.

Column 16, line 52, "used." should read --used.)--.

Column 18, line 43, "groupsing" should read --groupings--.

Column 18, line 49, "the axis" should read --The axis--.

Column 18, line 54, "polnts" should read --points--.

Column 19, line 32, "The velocity" should start a new paragraph.

Column 20, line 12, "leg depth" should read --leg_depth--.

Column 21, line 41, "Such" should start a new paragraph.

Column 21, line 49, "Certain relationships" should start a new paragraph.

Column 28, line 34, "pl" should read --p1--.

Column 28, line 55, after "x-y" insert --plane relative to p1 and the laser. We will--.

Column 28, line 55, after "lie" delete "p1".

UNITED STATES PATENT AND TRADEMARK OFFICE
CERTIFICATE OF CORRECTION

PATENT NO. : 5,046,852
DATED : September 10, 1991
INVENTOR(S) : Albert L. Hametner; Larry L. Tammell It is certified that error appears in the above-identified patent and that said Letters Patent is hereby corrected as shown below:

Column 29, line 64, "selectd" should read --selected--.

Column 30, line 63, "Axis Direction" should read -- - Axis_Direction--.

Column 30, line 65, "Discard Bends" should read -- - Discard_Bends--.

Column 30, line 67, "Segment Legs" should read -- - Segment_Legs--.

Column 31, line 62, "code." should read --code.)--.

Column 32, line 16, delete the "o" after "selected".

Column 33, line 10, "a set" should read -- - a set--.

Column 33, line 12, "one or more" should read -- -one or more--.

Column 34, line 50, "Algorithm Summary" should be underlined.

Column 35, line 43, "Plane" should read --plane--.

Column 37, line 54, "$(r_x x \cdot k)$" should read --$(r_x x k)$--.

Column 38, line 49, "nons-purious" should read --non-spurious--.

UNITED STATES PATENT AND TRADEMARK OFFICE
CERTIFICATE OF CORRECTION

PATENT NO. : 5,046,852

DATED : September 10, 1991

INVENTOR(S) : Albert L. Hametner; Larry L. Tammell

It is certified that error appears in the above-identified patent and that said Letters Patent is hereby corrected as shown below:

Column 39, line 21, after "value for" insert --min_dist--.

Column 44, line 6, after "workpiece," "using a position" should start a new paragraph.

Signed and Sealed this

Twenty-first Day of September, 1993

Attest:

BRUCE LEHMAN

*Attesting Officer*  *Commissioner of Patents and Trademarks*